US 12,094,160 B2

(12) United States Patent
Sawada et al.

(10) Patent No.: US 12,094,160 B2
(45) Date of Patent: Sep. 17, 2024

(54) OBJECT DETECTION APPARATUS, OBJECT DETECTION SYSTEM, OBJECT DETECTION METHOD, AND NON-TRANSITORY COMPUTER READABLE MEDIUM STORING PROGRAM

(71) Applicant: NEC Corporation, Tokyo (JP)

(72) Inventors: Azusa Sawada, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 376 days.

(21) Appl. No.: 17/604,494

(22) PCT Filed: Apr. 22, 2019

(86) PCT No.: PCT/JP2019/017072
§ 371 (c)(1),
(2) Date: Oct. 18, 2021

(87) PCT Pub. No.: WO2020/217283
PCT Pub. Date: Oct. 29, 2020

(65) Prior Publication Data
US 2022/0215579 A1  Jul. 7, 2022

(51) Int. Cl.
*G06T 7/00* (2017.01)
*G06T 7/73* (2017.01)

(52) U.S. Cl.
CPC ...... *G06T 7/74* (2017.01); *G06T 2207/20081* (2013.01)

(58) Field of Classification Search
CPC .............. G06T 7/74; G06T 2207/20081; G06T 2207/10024; G06T 2207/10048;
(Continued)

(56) References Cited

U.S. PATENT DOCUMENTS

| 2016/0180195 A1* | 6/2016 | Martinson ............ G06V 10/764 382/103 |
| 2019/0005353 A1* | 1/2019 | Tullberg ............... G06F 18/214 |
| 2019/0349572 A1* | 11/2019 | Uemori ................ G06V 10/454 |

FOREIGN PATENT DOCUMENTS

| JP | 2017-146957 A | 8/2017 |
| WO | 2018/147059 A1 | 8/2018 |

OTHER PUBLICATIONS

Shibata et al, Misalignment-robust joint filter for cross-modal image pairs, ICCV (Year: 2017).*

(Continued)

*Primary Examiner* — Ping Y Hsieh
*Assistant Examiner* — Xiao Liu

(57) ABSTRACT

An input image acquisition unit acquires a plurality of input images in which a specific detection target is captured by a plurality of different modalities. A perturbed image acquisition unit acquires a plurality of perturbed images in which at least one of the plurality of input images is perturbed. A detection processing unit detects a detection target included in the input images using each of the plurality of perturbed images and one of the plurality of input images that has not been perturbed, and acquires, for each of the plurality of perturbed images, a detection position of the detection target and a detection confidence level as detection results. An adjustment unit calculates, based on the detection positions and the confidence levels acquired for the plurality of perturbed images, an adjusted confidence level for each of the perturbed images using integrated parameters.

11 Claims, 14 Drawing Sheets

(58) Field of Classification Search
CPC . G06T 2207/20084; G06T 2207/30196; G06T 7/70; G06T 7/174
See application file for complete search history.

(56) References Cited

OTHER PUBLICATIONS

International Search Report for PCT Application No. PCT/JP2019/017072, mailed on Jul. 9, 2019.
Jingjing Liu, Shaoting Zhang, Shu Wang and Dimitris Metaxas, "Multispectral Deep Neural Networks for Pedestrian Detection", Proceedings of the British Machine Vision Conference [online], Internet: <URL:http://www.bmva.org/bmvc/2016/papers/paper073/paper073.pdf> <DOI: 10.5244/C.30.73>, Sep. 2016, pp. 73.1-73.13.

* cited by examiner

OBJECT DETECTION APPARATUS, OBJECT DETECTION SYSTEM, OBJECT DETECTION METHOD, AND NON-TRANSITORY COMPUTER READABLE MEDIUM STORING PROGRAM

This application is a National Stage Entry of PCT/JP2019/017072 filed on Apr. 22, 2019, the contents of all of which are incorporated herein by reference, in their entirety.

TECHNICAL FIELD

The present disclosure relates to an object detection apparatus, an object detection system, an object detection method, and a non-transitory computer readable medium storing a program.

BACKGROUND ART

A method using a plurality of input images is sometimes used for object detection using images. For example, rather than using only one input image (e.g., a visible light image), it is better to use another modality (e.g., an infrared light image) along with the above input image for performing accurate object detection regardless of changes in the image-capturing environment (e.g., Non-Patent Literature 1). That is, if, for example, only a visible light image is used in object detection, it is difficult to perform object detection in poor lighting conditions such as at nighttime. In order to solve this problem, by performing object detection using multi-modality images in which visible light is combined with other modalities such as infrared rays (far infrared rays) or distance images, it becomes possible to maintain or improve the performance (accuracy) of the object detection in a greater variety of situations.

CITATION LIST

Non-Patent Literature

[Non-Patent Literature 1] Jingjing Liu, Shaoting Zhang, Shu Wang and Dimitris Metaxas. "Multispectral Deep Neural Networks for Pedestrian Detection" Proceedings of the British Machine Vision Conference, 2016

SUMMARY OF INVENTION

Technical Problem

In a case where a plurality of input images are captured by using a plurality of modalities, when a plurality of input images are captured by a plurality of different cameras (e.g., a visible light camera and an infrared light camera), it is possible that parallax may occur due to a difference in positions (optical axes) of the cameras. Further, when input images are captured by one camera at a plurality of different times, it is possible that a detection target object or the camera may move over time. Therefore, when a plurality of input images are captured by a plurality of modalities, it is possible that the positions of the detection target object in the images may not correspond to each other; that is, a positional deviation may occur. According to the technique disclosed in Non-Patent Literature 1 mentioned above, the problem of the positional deviation of the detection target object in the plurality of input images is avoided by mechanically aligning the plurality of input images by using special equipment. However, according to the method of mechanically aligning the input images, errors are likely to occur due to poor adjustment of the equipment, and thus it is possible that the object detection may not be performed with a high accuracy.

The present disclosure has been made in order to solve the aforementioned problem and the aim of the present disclosure is to provide an object detection apparatus, an object detection system, an object detection method, and a program capable of performing object detection with a high accuracy.

Solution to Problem

An object detection apparatus according to the present disclosure includes: input image acquisition means for acquiring a plurality of input images in which a specific detection target is captured by a plurality of different modalities; perturbed image acquisition means for acquiring a plurality of perturbed images in which at least one of the plurality of input images is perturbed; detection processing means for detecting the detection target included in the input images using each of the plurality of perturbed images and one of the plurality of input images that has not been perturbed, and acquiring, for each of the plurality of perturbed images, a detection position of the detection target and a detection confidence level as detection results; adjustment means for calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and output means for outputting detection results of the detection target based on the adjusted confidence levels.

Further, an object detection system according to the present disclosure includes at least one image-capturing device and an object detection apparatus, and the object detection apparatus includes: input image acquisition means for acquiring a plurality of input images which are captured by the image-capturing device and in which a specific detection target is captured by a plurality of different modalities; perturbed image acquisition means for acquiring a plurality of perturbed images in which at least one of the plurality of input images is perturbed; detection processing means for detecting the detection target included in the input images using each of the plurality of perturbed images and one of the plurality of input images that has not been perturbed, and acquiring, for each of the plurality of perturbed images, a detection position of the detection target and a detection confidence level as detection results; adjustment means for calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and output means for outputting detection results of the detection target based on the adjusted confidence levels.

Further, an object detection method according to the present disclosure includes: acquiring a plurality of input images in which a specific detection target is captured by a plurality of different modalities; acquiring a plurality of perturbed images in which at least one of the plurality of input images is perturbed; detecting the detection target included in the input images using each of the plurality of perturbed images and one of the plurality of input images that has not been perturbed, and acquiring, for each of the plurality of perturbed images, a detection position of the detection target and a detection confidence level as detection results; calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and outputting detection results of the detection target based on the adjusted confidence levels.

Further, a program according to the present disclosure causes a computer to execute the following steps of: acquiring a plurality of input images in which a specific detection target is captured by a plurality of different modalities; acquiring a plurality of perturbed images in which at least one of the plurality of input images is perturbed; detecting the detection target included in the input images using each of the plurality of perturbed images and one of the plurality of input images that has not been perturbed, and acquiring, for each of the plurality of perturbed images, a detection position of the detection target and a detection confidence level as detection results; calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and outputting detection results of the detection target based on the adjusted confidence levels.

Advantageous Effects of Invention

According to the present disclosure, it is possible to provide an object detection apparatus, an object detection system, an object detection method, and a program capable of performing object detection with a high accuracy.

DESCRIPTION OF EMBODIMENTS

Outline of Example Embodiment According to Present Disclosure

Figure 1:
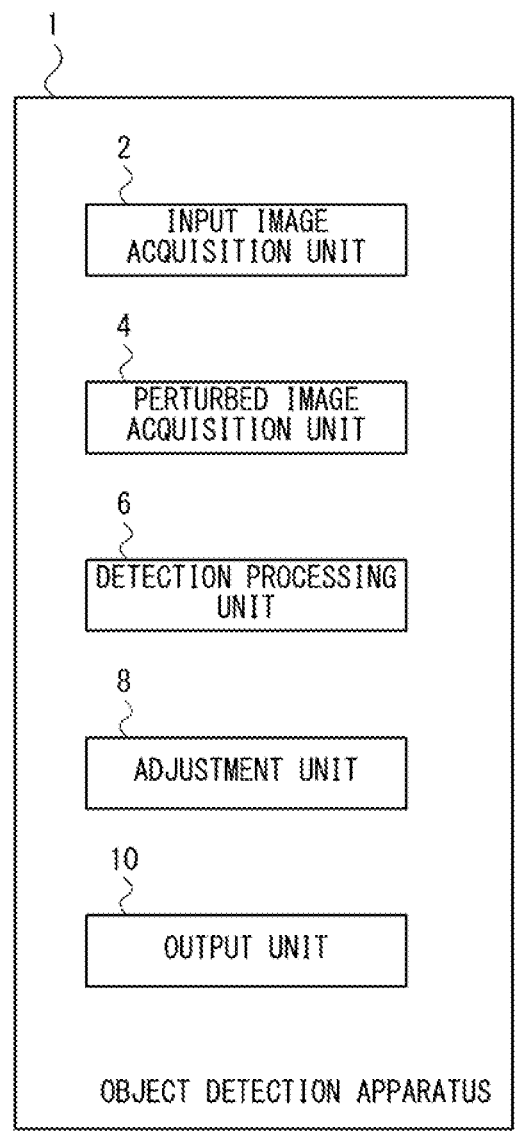
FIG. 1 is a diagram showing an outline of an object detection apparatus according to an example embodiment of the present disclosure.

Prior to giving a description of an example embodiment of the present disclosure, an outline of the example embodiment of the present disclosure will be described. FIG. 1 is a diagram showing an outline of an object detection apparatus 1 according to the example embodiment of the present disclosure. The object detection apparatus 1 is, for example, a computer.

The object detection apparatus 1 includes an input image acquisition unit 2, a perturbed image acquisition unit 4, a detection processing unit 6, an adjustment unit 8, and an output unit 10. The input image acquisition unit 2, the perturbed image acquisition unit 4, the detection processing unit 6, the adjustment unit 8, and the output unit 10 respectively function as input image acquisition means, perturbed image acquisition means, detection processing means, adjustment means, and output means.

The input image acquisition unit 2 acquires a plurality of input images in which a specific detection target is captured by a plurality of different modalities. In the plurality of input images captured by the plurality of modalities, at least one of an image-capturing position and an image-capturing time is deviated from each other. The perturbed image acquisition unit 4 acquires a plurality of perturbed images in which at least one of the plurality of input images is perturbed. The detection processing unit 6 detects a detection target included in the input images using each of the plurality of perturbed images and one of the plurality of input images that has not been perturbed, and acquires, for each of the plurality of perturbed images, a detection position of the detection target and a detection confidence level (i.e., a detection confidence rating) as detection results. The adjustment unit 8 calculates, based on the detection positions and the confidence levels acquired for the plurality of perturbed images, an adjusted confidence level for each of the perturbed images using integrated parameters. The integrated parameters are parameters for making an adjustment in such a way that the confidence level of a set of the input image that has not been perturbed and the perturbed image, in which the position of the detection target in the input image coincides with the position of the detection target in the perturbed image, becomes relatively high. The output unit 10 outputs the detection results of the detection target based on the adjusted confidence levels.

The aforementioned Non-Patent Literature 1 performs object detection using a set of a visible light image (a color image) and an infrared light image (a thermal image) as input images. As described above, in Non-Patent Literature 1, it is assumed that alignment is performed by special equipment (a spectroscopic filter or the like). By this way, when the positions of the detection target in the plurality of input images correspond to each other, it is possible to perform accurate object detection by locally fusing information (features) for each image. However, if the alignment is not performed due to some reason, it is possible that the information may not be correctly fused. In this case, accurate object detection cannot be performed. That is, when the positions of the object in the plurality of input images are deviated from each other due to parallax or the like, it is possible that the accuracy of a class confidence level of the detection target and the detection position (rectangular position) may deteriorate.

On the other hand, the object detection apparatus 1 according to the example embodiment is configured to acquire a plurality of perturbed images in which at least one of a plurality of input images (images of a plurality of modalities) that are not assumed to be aligned is perturbed. Then, the object detection apparatus 1 according to this example embodiment is configured to calculate the adjusted confidence level for each of the perturbed images using the integrated parameters and output the detection results of the detection target based on the adjustment confidence levels. Accordingly, it becomes possible to perform object detection with a high accuracy even without mechanically aligning the plurality of input images captured by the plurality of different modalities using special equipment. Further, while there may always be a risk of errors in alignment unless special equipment is used, according to the configuration of the present disclosure stated above, it is possible to prevent errors in alignment from influencing the accuracy of the object detection. Accordingly, the object detection apparatus 1 according to this example embodiment is able to perform object detection with a high accuracy using a plurality of input images captured by a plurality of different modalities.

Note that, by using an object detection method executed by the object detection apparatus 1 as well, object detection can be performed with a high accuracy using the plurality of input images captured by the plurality of different modalities. Further, by using a program that executes the object detection method as well, object detection may be performed with a high accuracy using the plurality of input images captured by the plurality of different modalities. Further, by using an object detection system that uses the object detection apparatus 1 and at least one image-capturing device (camera) as well, object detection may be performed with a high accuracy using the plurality of input images captured by the plurality of different modalities.

First Example Embodiment

Hereinafter, with reference to the drawings, an example embodiment will be described. For the sake of clarification of the description, the following description and the drawings are omitted and simplified as appropriate. Further, throughout the drawings, the same components are denoted by the same reference symbols and overlapping descriptions will be omitted as appropriate.

Figure 2:
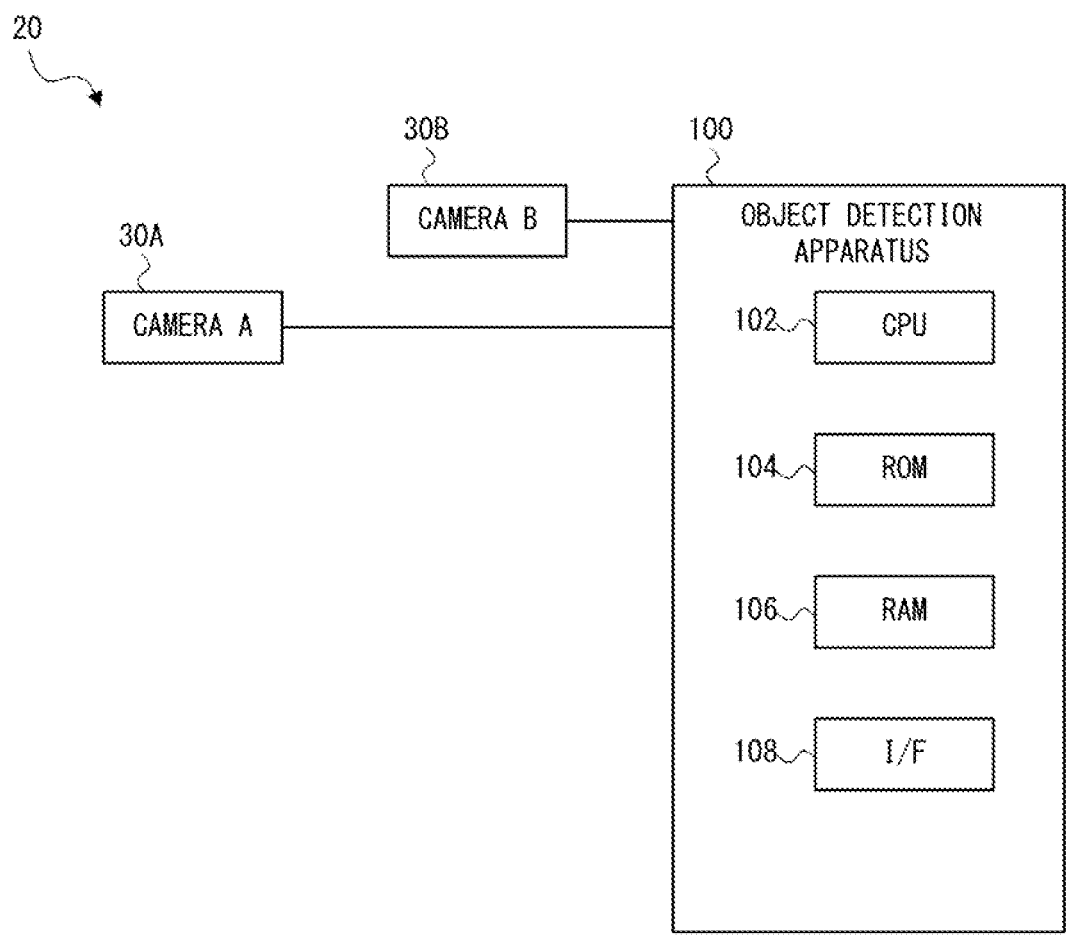
FIG. 2 is a diagram showing a configuration of an object detection system according to a first example embodiment.

FIG. 2 is a diagram showing a configuration of an object detection system 20 according to a first example embodiment. The object detection system 20 according to the first example embodiment includes a camera 30A (a camera A), a camera 30B (a camera B), and an object detection apparatus 100. In the following description, the cameras 30A and 30B may be simply referred to as a camera 30 when there is no need to differentiate between them. The camera 30 is an image-capturing device that captures images of an object, which is a specific detection target. The camera 30 captures (generates) input images input to the object detection apparatus 100.

The object detection system 20 may be provided with three or more cameras 30. Alternatively, the object detection system 20 may be provided with only one camera 30. That is, the object detection system 20 includes at least one image-capturing device (camera 30). While the camera 30 captures images of a human being as a detection target in the following example embodiment, the detection target is not limited to a human being and may be a desired one. Further, the number of targets to be detected is not limited to one. The camera 30A and the camera 30B capture images of an object by modalities different from each other. The object detection apparatus 100 is a computer that performs image processing on a set of input images captured by the plurality of different modalities.

The set of input images captured by the plurality of modalities means a set of images in which a specific detection target is captured by a plurality of different modalities. The term "modality" herein is an image form and indicates, for example, an image-capturing mode of an image-capturing device by visible light, far-infrared light or the like. Therefore, images captured by one modality indicate data of images captured by one image-capturing mode. Further, the set of images captured by the plurality of modalities may be simply referred to as a multimodality image and may also be referred to as "images of the plurality of modalities" or more simply "plurality of images" in the following description. The detection target, which is an object reflected in the captured image, is a target object that should be detected by image recognition. The detection target is not limited to an object itself and may also include a non-object such as a state of deterioration or abnormality of an object. The images of the plurality of modalities may be the ones captured by the plurality of cameras that correspond to the plurality of respective modalities at the same time or at times in which differences between them are within a few milliseconds of each other.

The camera 30A is, for example, a visible light camera and captures (generates) an input image A, which is a visible light image. Further, the camera 30B is, for example, an infrared light camera that detects far infrared rays, and captures (generates) an input image B, which is an infrared light image. Since the position where the camera 30A is installed and the position where the camera 30B is installed are different from each other, the optical axis of the camera 30A and the optical axis of the camera 30B are different from each other. Accordingly, positional deviation may occur between the input image A and the input image B. Further, the camera 30A and the camera 30B may perform panning, tilting, and zooming in a way similar to each other. Hereinafter, the term "an image(s)" may also indicate "image data indicating an image(s)", which is a target to be processed in information processing. Further, the image(s) may be a still image(s) or a moving image(s).

Note that "the images of the plurality of modalities (input images)" may be images captured by one camera at times close to each other. It is assumed, in this case, that this camera captures images by switching the plurality of modalities at predetermined intervals. When, for example, an image of the input image A is a visible image, the image of the input image B may be an image that is captured by the same camera and whose image-capturing time is slightly different from the time when the image of the input image A is captured. In this case, the images of the plurality of modalities may be images of frames that are adjacent to each other or images that are separated from each other by several frames captured by one camera. When the camera is mounted on a mobile body such as a vehicle and captures images outside the vehicle, even the positional deviation between captured images of frames that are adjacent to each other is not negligible. Further, even when images of one target are successively captured by one camera installed in a fixed position, the positional deviation of a target may occur due to a movement in the target. Therefore, the positional deviation of the display position of one target occurs even between images of the plurality of modalities captured by different modalities by one camera.

The object detection apparatus 100 is, for example, a computer. The object detection apparatus 100 is connected to the camera 30 in such a way that they can communicate with each other by a wire or wirelessly. The object detection apparatus 100 acquires a set of input images. The object detection apparatus 100 performs object detection using this set of input images. The object detection apparatus 100 acquires a plurality of perturbed images obtained by perturbing at least one of the plurality of input images. The object detection apparatus 100 detects an object included in the input images using each of the plurality of perturbed images and one of the plurality of input images that has not been perturbed, and acquires, for each of the plurality of perturbed images, the detection position of the object and a detection confidence level (i.e., a detection confidence rating). The object detection apparatus 100 calculates, based on the detection positions and the confidence levels acquired for the plurality of perturbed images, an adjusted confidence level for each of the perturbed images using parameters that correct an influence of perturbation on the detection results. The object detection apparatus 100 narrows down the detection results obtained by using the plurality of perturbed images based on the adjusted confidence levels and determines appropriate detection results. The object detection apparatus 100 outputs the determined detection results.

The object detection apparatus 100 includes, as a main hardware configuration, a Central Processing Unit (CPU) 102, a Read Only Memory (ROM) 104, a Random Access Memory (RAM) 106, and an Interface (IF) unit 108. The CPU 102, the ROM 104, the RAM 106, and the interface unit 108 are connected to one another via a data bus or the like.

The CPU 102 has a function as an arithmetic apparatus that performs control processing, arithmetic processing and so on. The ROM 104 has a function of storing a control program, an arithmetic program and so on to be executed by the CPU 102. The RAM 106 has a function of temporarily storing processing data or the like. The interface unit 108 inputs and outputs signals from and to the outside by wired or wireless connection. Further, the interface unit 108 receives a data input operation by a user and displays information for the user. For example, the interface unit 108 communicates with the camera 30. Further, the interface unit 108 displays detection results.

Figure 3:
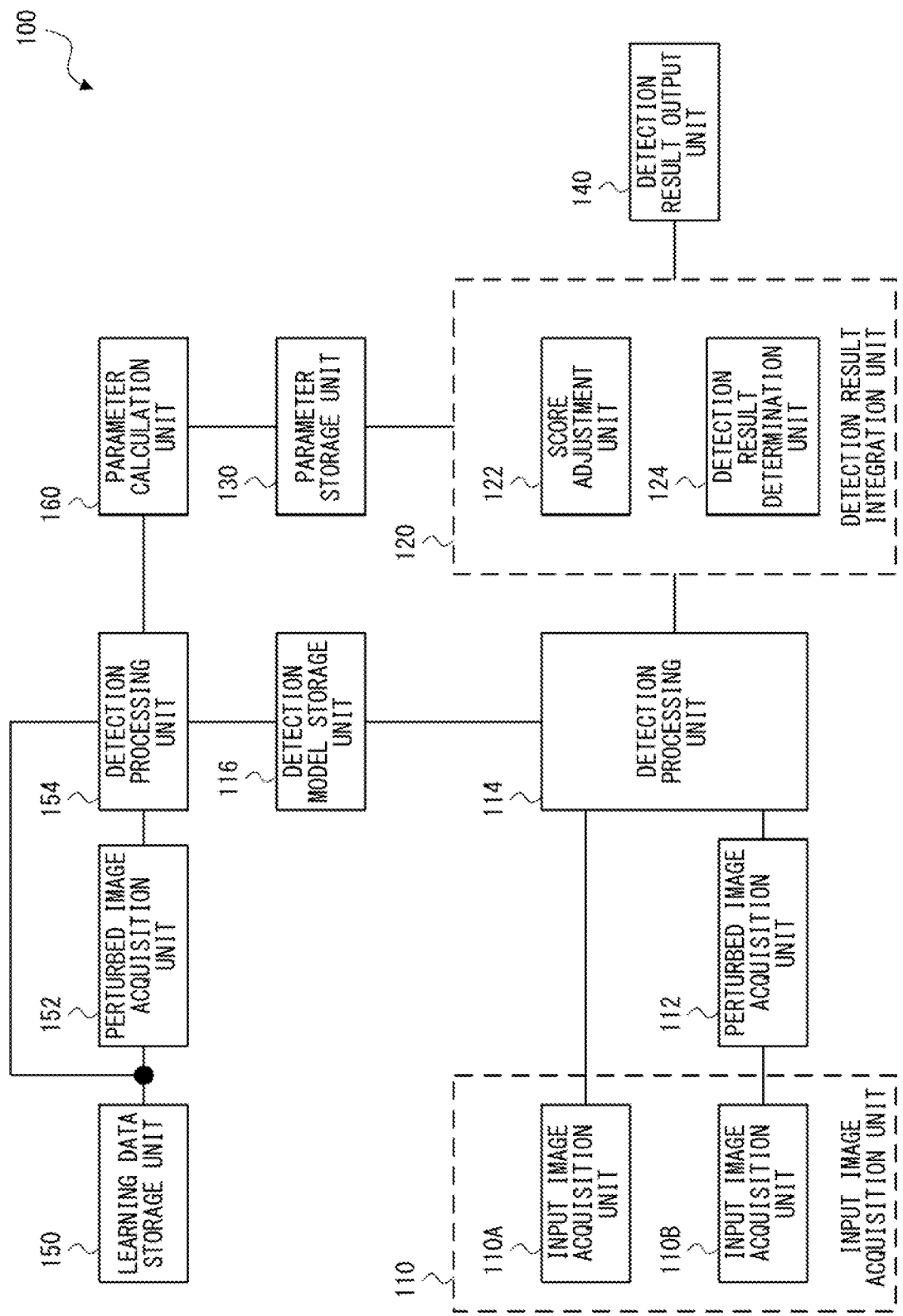
FIG. 3 is a functional block diagram showing a configuration of the object detection apparatus according to the first example embodiment.

FIG. 3 is a functional block diagram showing a configuration of the object detection apparatus 100 according to the first example embodiment. The object detection apparatus 100 includes an input image acquisition unit 110, a perturbed image acquisition unit 112, a detection processing unit 114, a detection model storage unit 116, a detection result integration unit 120, a parameter storage unit 130, and a detection result output unit 140. The object detection apparatus 100 further includes a learning data storage unit 150, a perturbed image acquisition unit 152, a detection processing unit 154, and a parameter calculation unit 160. The input image acquisition unit 110 includes an input image acquisition unit 110A and an input image acquisition unit 110B. The detection result integration unit 120 includes a score adjustment unit 122 and a detection result determination unit 124.

The input image acquisition unit 110, the perturbed image acquisition unit 112, the detection processing unit 114, and the detection model storage unit 116 respectively function as input image acquisition means, perturbed image acquisition means, detection processing means, and detection model storage means. Further, the detection result integration unit 120, the parameter storage unit 130, and the detection result output unit 140 respectively function as detection result integration means, parameter storage means, and detection result output means. Further, the learning data storage unit 150, the perturbed image acquisition unit 152, the detection processing unit 154, and the parameter calculation unit 160 respectively function as learning data storage means, perturbed image acquisition means, detection processing means, and parameter calculation means. Further, the score adjustment unit 122 and the detection result determination unit 124 respectively function as score adjustment means and detection result determination means.

The input image acquisition unit 110, the perturbed image acquisition unit 112, the detection processing unit 114, the detection model storage unit 116, the detection result integration unit 120, the parameter storage unit 130, and the detection result output unit 140 function in an operation stage where object detection is performed. Further, the learning data storage unit 150, the perturbed image acquisition unit 152, the detection processing unit 154, the detection model storage unit 116, the parameter calculation unit 160, and the parameter storage unit 130 function in the learning stage where the function of the detection result integration unit 120 is learned. The perturbed image acquisition unit 112 and the perturbed image acquisition unit 152 may include functions substantially similar to each other. Further, the detection processing unit 114 and the detection processing unit 154 may include functions substantially similar to each other. In particular, the detector (detection model) used by the detection processing unit 114 is the same as the detector used by the detection processing unit 154.

Figure 4:
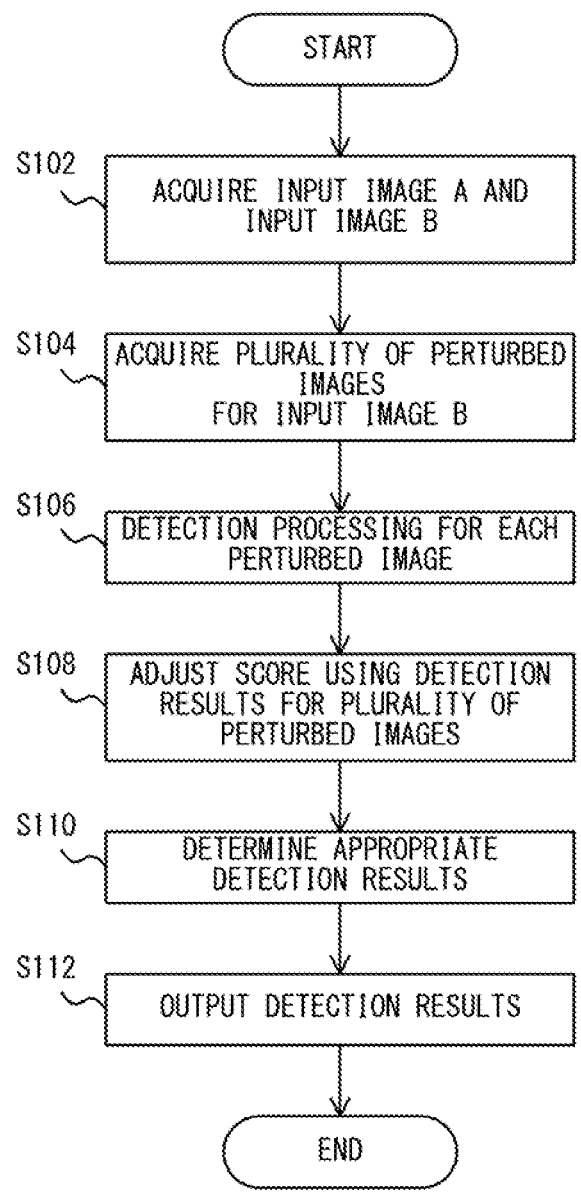
FIG. 4 is a flowchart showing an object detection method related to an operation stage performed by the object detection apparatus according to the first example embodiment.

Note that each component shown in FIG. 3 can be implemented, for example, by the CPU 102 executing a program stored in the ROM 104. Further, a necessary program may be stored in any non-volatile recording medium and may be installed as appropriate. Each component may not be limited to being implemented by software as described above and may instead be implemented by hardware such as some kind of circuit element. Further, one or more of the aforementioned components may be respec- FIG. 4 is a flowchart showing an object detection method related to the operation stage performed by the object detection apparatus 100 according to the first example embodiment. The input image acquisition unit 110 acquires the input image A and the input image B (Step S102). Specifically, the input image acquisition unit 110A acquires the input image A (e.g., a visible light image) from the camera 30A. Further, the input image acquisition unit 110B acquires the input image B (e.g., an infrared light image) from the camera 30B.

The perturbed image acquisition unit 112 acquires a plurality of perturbed images for the input image B (Step S104). Specifically, the perturbed image acquisition unit 112 generates a plurality of perturbed images (perturbed image group) by perturbing, for example, the input image B for each certain amount of perturbation in a direction in accordance with the positional relation between the camera 30A and the camera 30B. In the example shown in FIG. 5 that will be described later, the input image 40A is not perturbed. The perturbed images will be further described with reference to FIG. 5.

Figure 5:
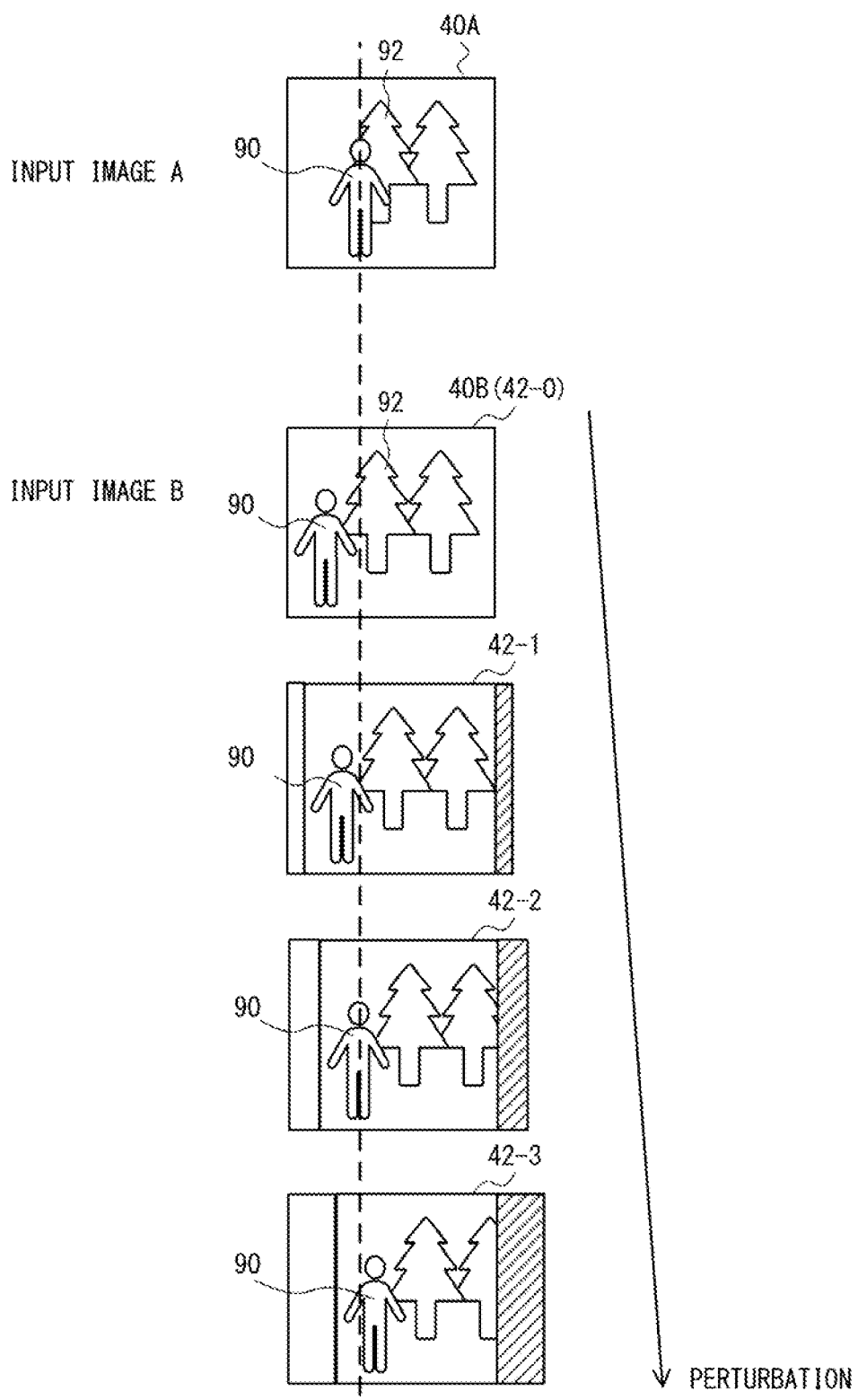
FIG. 5 is a diagram illustrating a plurality of perturbed images generated by a perturbed image acquisition unit in the operation stage according to the first example embodiment.

FIG. 5 is a diagram illustrating a plurality of perturbed images generated by the perturbed image acquisition unit 112 in the operation stage according to the first example embodiment. It is assumed that the angle of view of the camera 30A and that of the camera 30B are the same. It is further assumed that the detection target is a human being. It is further assumed that the camera 30B captures images of the detection target from the right side with respect to the camera 30A. In this case, the position of a detection target image 90 included in the input image 40B (the input image B) with respect to a background image 92 is deviated to the left side of the position of the detection target image 90 included in the input image 40A (the input image A) with respect to the background image 92. In other words, when the position of the background image 92 in the input image 40A is substantially the same as the position of the background image 92 in the input image 40B, the position of the detection target image 90 in the input image 40B is deviated to the left side with respect to the position of the detection target image 90 in the input image 40A.

At this time, the perturbed image acquisition unit 112 translates the input image 40B to the right direction at constant intervals (e.g., for every certain number of pixels). Accordingly, the perturbed image acquisition unit 112 generates perturbed images 42-1 to 42-3. The input image 40B based on which the perturbation has been performed may be included in the plurality of perturbed images 42 as a perturbed image 42-0. That is, the input image 40B is the perturbed image 42 with a perturbation amount of 0.

In the example shown in FIG. 5, the position of the detection target image 90 in the perturbed image 42-2 corresponds to the position of the detection target image 90 in the input image 40A. That is, by generating the plurality of perturbed images 42 (42-0 to 42-3) as stated above, a perturbed image 42 that approximately cancels the positional deviation of the detection target image 90 in the input image 40B with respect to the input image 40A may be generated.

While four perturbed images 42, including the original input image 40B, are generated in the example shown in FIG. 5, the number of perturbed images 42 that are generated may be a desired number. The right side part of the perturbed images 42 (shown by shaded hatching in FIG. 5) that is out of the angle of view due to the right side translation may either be deleted or added to the left side part of the perturbed images 42 that is left blank by the parallel translation. Further, when the distance from the camera 30A and the camera 30B to the detection target can be estimated, the perturbation amount may be changed in accordance with the distance. The same holds true for processing of S154 that will be described later.

The detection processing unit 114 performs object detection processing for each perturbed image 42 using a detection model stored in the detection model storage unit 116 (Step S106). That is, the detection processing unit 114 detects the detection target included in the input images using each of the plurality of perturbed images 42 and the input image 40A that has not been perturbed. Note that the detection model is a learning model (recognition dictionary) for object detection, learned by machine learning such as, for example, deep learning in advance. The detection model is, for example, a neural network or the like. Therefore, the detection processing unit 114 performs detection processing using a detector implemented by the detection model stored in the detection model storage unit 116. Then, the detection processing unit 114 acquires, for each of the plurality of perturbed images 42, detection results (the detection position of the detection target and the detection confidence level (class confidence level; score)) by object detection processing.

Note that the detection model may be generated by performing machine learning using a plurality of modality images where there is no positional deviation and a ground truth label is attached. In this case, the detection model may be generated by performing machine learning using learning data stored in the learning data storage unit 150 that will be described later. Note that the detector (detection model) is not limited to the aforementioned example and may be a desired one.

Figure 6:
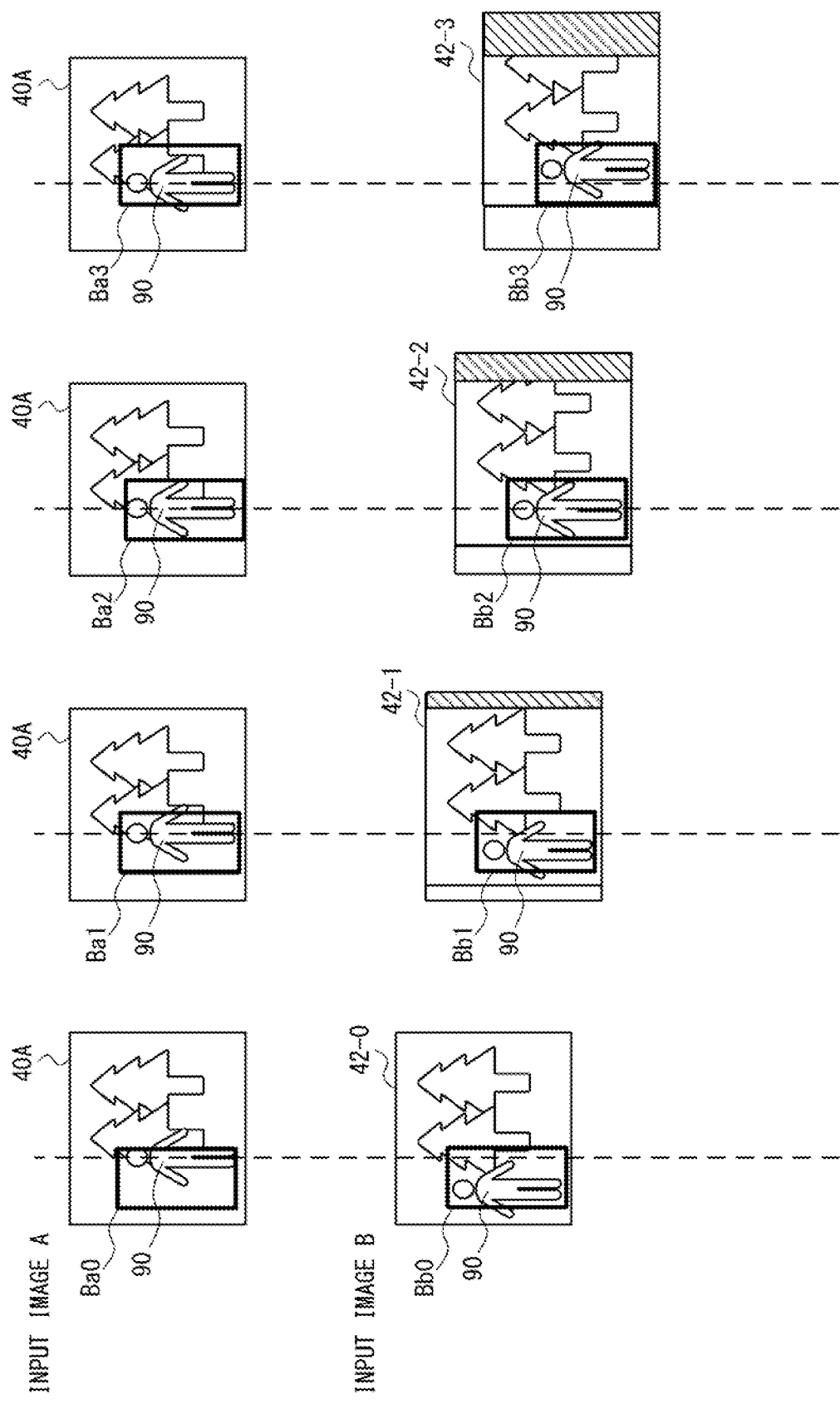
FIG. 6 is a diagram for describing detection processing performed by a detection processing unit in the operation stage according to the first example embodiment.

FIG. 6 is a diagram for describing detection processing performed by the detection processing unit 114 in the operation stage according to the first example embodiment. The detection processing unit 114 performs object detection using the input image 40A and the perturbed image 42-0. Accordingly, the detection processing unit 114 generates, for each of the input image 40A and the perturbed image 42-0, a rectangular area Ba0 and a rectangular area Bb0 indicating detection positions regarding the detection target image 90. The rectangular areas indicate areas where it is estimated to include the detection target image 90, that is, areas where the detection target image 90 has been detected. Further, the detection processing unit 114 generates a confidence level for each of the rectangular areas (detection results) (the same holds true for the other perturbed images).

Note that the detection position (detection coordinates) may be, for example, the central position (rectangular coordinates) of a rectangular area. Further, the position of the rectangular area Ba0 and that of the rectangular area Bb0 may be the same. In this case, the rectangular area Ba0 and the rectangular area Bb0 may be a rectangular area B0 that is common to the input image A and the input image B. Further, while one rectangular area is shown in each of the input image 40A and the perturbed image 42-0 in FIG. 6, when a plurality of detection results are generated for one detection target, a plurality of rectangular areas may be generated. Further, when there are a plurality of detection targets, the rectangular area may be generated for each of the plurality of detection targets. Further, the detection results (the rectangular area and the confidence level) may be generated only for one input image (e.g., the input image 40A).

The same holds true for detection results for other perturbed images 42 (and perturbation learning images) described below.

The detection processing unit 114 performs object detection using the input image 40A and the perturbed image 42-1. Accordingly, the detection processing unit 114 generates, for each of the input image 40A and the perturbed image 42-1, a rectangular area Ba1 and a rectangular area Bb1 (rectangular area B1) indicating the detection position regarding the detection target image 90. The detection processing unit 114 performs object detection using the input image 40A and the perturbed image 42-2. Accordingly, the detection processing unit 114 generates, for each of the input image 40A and the perturbed image 42-2, a rectangular area Ba2 and a rectangular area Bb2 (rectangular area B2) indicating the detection position regarding the detection target image 90. The detection processing unit 114 performs object detection using the input image 40A and the perturbed image 42-3. Accordingly, the detection processing unit 114 generates, for each of the input image 40A and the perturbed image 42-3, a rectangular area Ba3 and a rectangular area Bb3 (rectangular area B3) indicating the detection position regarding the detection target image 90.

The detection result integration unit 120 integrates the detection results (the detection positions and the confidence levels) obtained regarding the plurality of perturbed images 42 and determines appropriate detection results for the detection target image 90 (S108-S110). Specifically, the parameter storage unit 130 stores integrated parameters. The integrated parameters are parameters for adjusting confidence levels in such a way that the confidence level of a set of the input image 40A that has not been perturbed and the perturbed image 42, in which the position of the detection target in the input image 40A coincides with the position of the detection target in the perturbed image 42, becomes relatively high. The integrated parameters include a parameter for correcting the influence of perturbation of the input image on the detection results. As will be described later, the integrated parameters are calculated by the parameter calculation unit 160 in the learning stage. Then the score adjustment unit 122 calculates the adjusted confidence level for each of the plurality of perturbed images 42 using the integrated parameters based on the detection positions (rectangular coordinates) and the confidence levels acquired for the plurality of perturbed images 42 (Step S108). Hereinafter, calculating the adjusted confidence level (adjustment confidence level), that is, adjusting the confidence level, may be referred to as rescoring. Specific processing in the score adjustment unit 122 will be described later.

It is assumed here that the score adjustment unit 122 adjusts the confidence level for the first perturbed image of the plurality of perturbed images. In this case, the score adjustment unit 122 applies a weight so that a large weight is applied regarding the second perturbed image regarding a detection position whose distance to the detection position regarding the first perturbed image is short and accumulates the confidence levels in the plurality of perturbed images. Further, the integrated parameters include a correction parameter (a first parameter) and a weight adjustment parameter (a second parameter). The correction parameter is a parameter for correcting the distance (the distance between the detection position regarding the first perturbed image and the detection position regarding the second perturbed image) in accordance with a difference between a perturbation amount of the first perturbed image and a perturbation amount of the second perturbed image. Further, the weight adjustment parameter is a parameter for defining the weight with respect to the distance. The integrated parameters will be described later. The score adjustment unit 122 calculates the adjusted confidence level using a function $f(D,s)_{m,\alpha}$. The function $f(D,s)_{m,\alpha}$ is a function having D and s as variables and m and $\alpha$ as constants. Further, D denotes a detection position and s denotes a confidence level in D. Further, m and $\alpha$ are integrated parameters (constants). The symbol m is a correction parameter and $\alpha$ is a weight adjustment parameter. Specific examples of the function $f(D,s)_{m,\alpha}$ will be described later.

The detection result determination unit 124, based on the adjusted confidence levels, narrows down the plurality of detection results obtained by using the plurality of perturbed images and determines appropriate detection results (Step S110). As a result of rescoring performed by the score adjustment unit 122, among a plurality of sets of the input image 40A and the perturbed image 42, the adjustment confidence level for a set, of the input image 40A and the perturbed image 42, in which the position of the detection target image 90 in the input image 40A coincides with that in the perturbed image 42 may become the highest. Accordingly, detection results for a set of images where the positions of the detection target images 90 coincide with each other may be the most reliable. Therefore, the detection result determination unit 124 determines, for each of the detection target images 90, detection results whose adjustment confidence level is the largest as the appropriate detection results. Then, the detection result determination unit 124 deletes (eliminates) the other detection results having low adjustment confidence levels.

Figure 7:
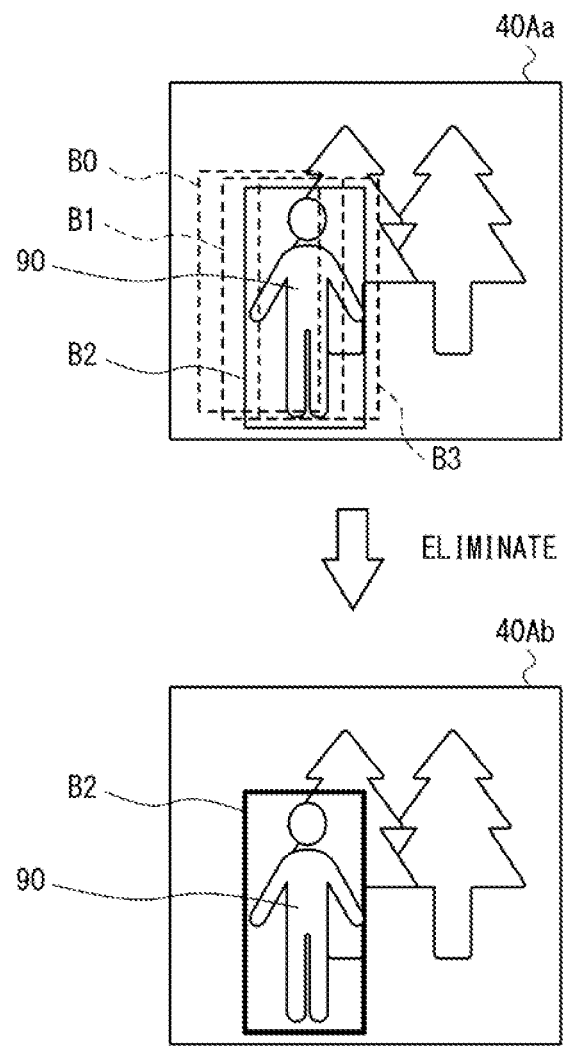
FIG. 7 is a diagram for describing results of processing in a detection result integration unit according to the first example embodiment.

FIG. 7 is a diagram for describing results of processing by the detection result integration unit 120 according to the first example embodiment. An input image 40Aa is an image in which rectangular areas B0-B3 regarding the detection results obtained for each perturbed image 42 are superimposed on the input image 40A. In this case, the adjustment confidence level regarding the rectangular area B2 becomes the highest due to the processing in S108. In other words, the score adjustment unit 122 adjusts (rescores) the confidence level regarding the detection results obtained for each perturbed image 42 by the integrated parameters in such a way that the adjustment confidence level regarding the rectangular area B2 becomes the highest.

The detection result determination unit 124 determines, for rectangular areas related to the same class, that a set of rectangular areas whose size of overlap is equal to or larger than a predetermined threshold indicates the detection results regarding the same detection target image 90. The detection result determination unit 124 may calculate, as the size of the overlap, Intersection over Union (IoU) for a set of rectangular areas that have been detected. The IoU is a ratio of the area of the common part of the respective rectangular areas with respect to the area in which the respective rectangular areas are merged (an area of the sum set of the rectangular areas). In the example shown in FIG. 7, it is determined that the size of the overlap of each set of the rectangular areas B0-B3 is equal to or larger than the threshold.

Then the detection result determination unit 124 determines, for the rectangular areas B0-B3 where the size of the overlap is equal to or larger than the threshold, the detection results whose corresponding adjustment confidence level is the highest as the appropriate detection results. In the example shown in FIG. 7, as described above, the adjustment confidence level regarding the rectangular area B2 is the highest. Therefore, the detection result determination unit 124 deletes detection results regarding the rectangular areas other than the rectangular area B2. Accordingly, the detection result determination unit 124 generates detection results as shown in an input image 40Ab in which the rectangular areas B0, B1, and B3 are deleted and only the rectangular area B2 is shown. That is, the detection result determination unit 124 is configured to eliminate (i.e., suppress) excessive detection results in accordance with the adjustment confidence level.

The detection result output unit 140 outputs the determined appropriate detection results to the interface unit 108 (Step S112). Specifically, the detection result output unit 140 displays, for example, the input image 40Ab illustrated in FIG. 7. That is, the detection result output unit 140 displays the detection results in which excessive detection results are eliminated (i.e., suppressed). At this time, the detection result output unit 140 may display the class confidence level near the rectangular area B2. This class confidence level may be a confidence level regarding the rectangular area B2 acquired in the processing of S106 or may be the adjustment confidence level regarding the rectangular area B2 rescored in S108.

Figure 8:
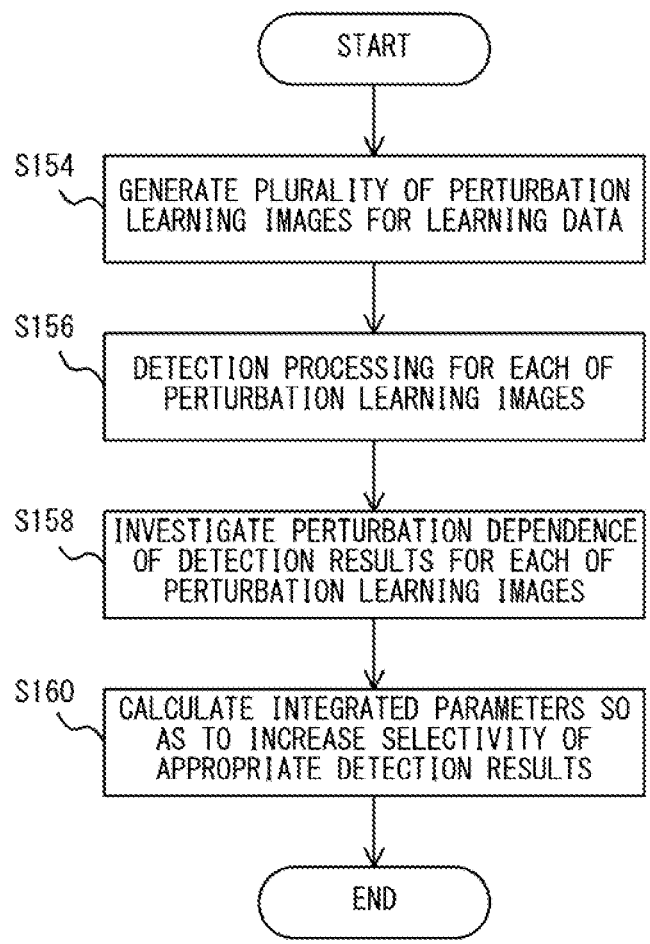
FIG. 8 is a flowchart showing an object detection method related to a learning stage performed by the object detection apparatus according to the first example embodiment.

FIG. 8 is a flowchart showing an object detection method related to the learning stage performed by the object detection apparatus 100 according to the first example embodiment. The perturbed image acquisition unit 152 generates a plurality of perturbed images (perturbation learning images) for learning data stored in the learning data storage unit 150 (Step S154). The learning data storage unit 150 stores learning data, which is a plurality of learning images to which a ground truth label is added in advance, the class of the detection target being associated with a ground truth position (ground truth area) that corresponds to this class in the ground truth label. Further, the plurality of learning images may be a plurality of modality images where there is no positional deviation. Therefore, the positions of the detection target in a plurality of learning images (plurality of modality images) coincide with each other.

Figure 9:
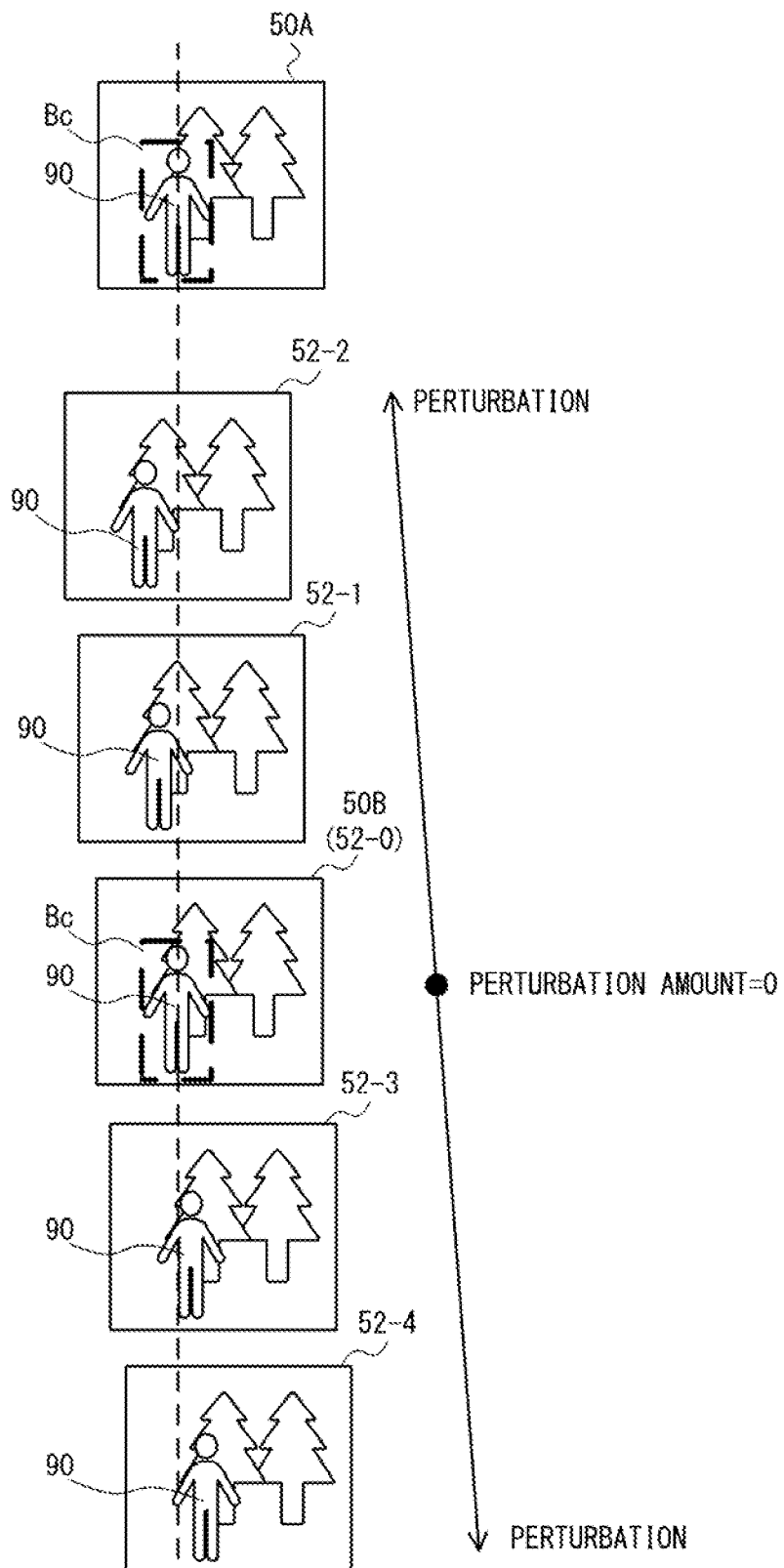
FIG. 9 is a diagram illustrating perturbation learning images generated by the perturbed image acquisition unit in the learning stage according to the first example embodiment.

FIG. 9 is a diagram illustrating perturbation learning images generated by the perturbed image acquisition unit 152 in the learning stage according to the first example embodiment. As shown in FIG. 9, the plurality of learning images include a learning image 50A captured by a modality the same as that of the camera 30A and a learning image 50B captured by a modality the same as that of the camera 30B. When object detection is performed using one camera, the learning image 50B may be the same as the learning image 50A. Further, as described above, a ground truth rectangular area Bc indicating the ground truth position is added to each of the learning image 50A and the learning image 50B. Then, the position of the detection target image 90 in the learning image 50A coincides with that in the learning image 50B.

At this time, the perturbed image acquisition unit 152 perturbs the learning image 50B for each certain amount of perturbation in accordance with the positional relation between the camera 30A and the camera 30B, like in the processing by the perturbed image acquisition unit 112. When the camera 30A and the camera 30B are aligned side by side to each other in the right-left direction, the perturbed image acquisition unit 152 translates the learning image 50B in the right or left direction. Accordingly, the perturbed image acquisition unit 152 generates a plurality of perturbation learning images 52-1 to 52-4. The perturbation learning images 52-1 and 52-2 are images obtained by translating the learning image 50B in the left direction (negative perturbation direction). The perturbation learning images 52-3 and 52-4 are images obtained by translating the learning image 50B in the right direction (positive perturbation direction). The learning image 50B based on which the perturbation has been performed (that is, the perturbation amount is 0) may be included in the plurality of perturbation learning images 52 as a perturbation learning image 52-0.

The detection processing unit 154 performs object detection processing for each of the perturbation learning images 52 using the detection model stored in the detection model storage unit 116 (Step S156). That is, the detection processing unit 154 detects a detection target included in the learning images using each of the plurality of perturbation learning images and a learning image that has not been perturbed. Note that the processing in the detection processing unit 154 is substantially the same as the processing in the detection processing unit 114 (S106). Then the detection processing unit 154 acquires, for each of the plurality of perturbation learning images, detection results (the detection position of the detection target and the detection confidence level (class confidence level; score)) by object detection processing.

Figure 10:
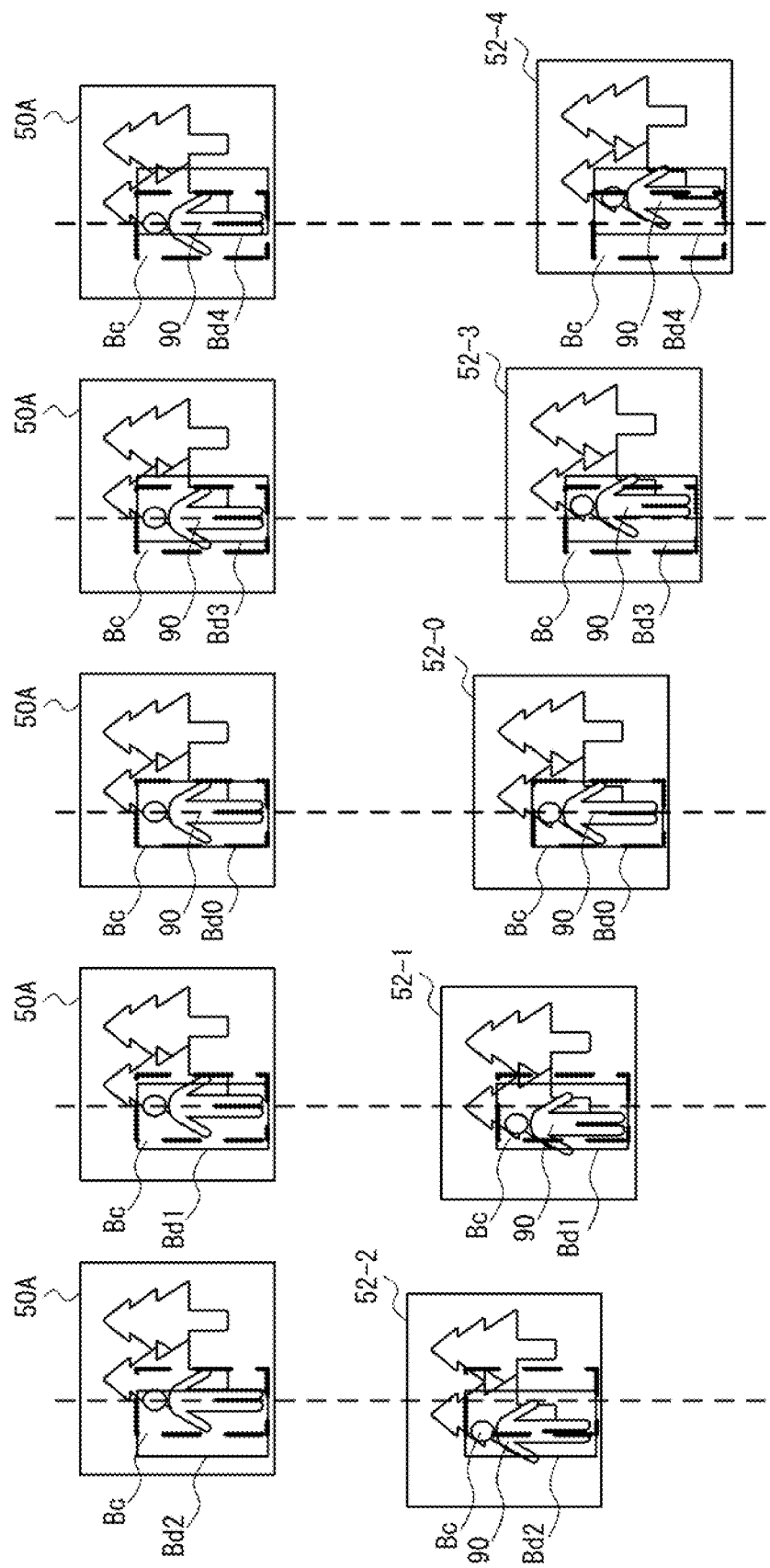
FIG. 10 is a diagram for describing detection processing performed by a detection processing unit in the learning stage according to the first example embodiment.

FIG. 10 is a diagram for describing detection processing performed by the detection processing unit 154 in the learning stage according to the first example embodiment. The detection processing unit 154 performs object detection using the learning image 50A and the perturbation learning image 52-0. Accordingly, the detection processing unit 154 generates a rectangular area Bd0 indicating the detection position regarding the detection target image 90. Further, the detection processing unit 154 generates a confidence level for each of the rectangular areas (detections). Since there is no positional deviation between the learning image 50A and the perturbation learning image 52-0, the rectangular area Bd0 may coincide with the ground truth rectangular area Bc.

Further, the detection processing unit 154 performs object detection using the learning image 50A and the perturbation learning image 52-1. Accordingly, the detection processing unit 154 generates a rectangular area Bd1 indicating the detection position regarding the detection target image 90. Since the positional deviation is occurring between the learning image 50A and the perturbation learning image 52-1 due to perturbation, the rectangular area Bd1 does not coincide with the ground truth rectangular area Bc and is deviated to the left side (the side of the perturbation direction) of the ground truth rectangular area Bc.

Further, the detection processing unit 154 performs object detection using the learning image 50A and the perturbation learning image 52-2. Accordingly, the detection processing unit 154 generates a rectangular area Bd2 indicating the detection position regarding the detection target image 90. Since the positional deviation is occurring between the learning image 50A and the perturbation learning image 52-2 due to perturbation, the rectangular area Bd2 does not coincide with the ground truth rectangular area Bc and is deviated to the left side (the side of the perturbation direction) of the ground truth rectangular area Bc.

Further, the detection processing unit 154 performs object detection using the learning image 50A and the perturbation learning image 52-3. Accordingly, the detection processing unit 154 generates a rectangular area Bd3 indicating the detection position regarding the detection target image 90. Since the positional deviation is occurring between the learning image 50A and the perturbation learning image 52-3 due to perturbation, the rectangular area Bd3 does not coincide with the ground truth rectangular area Bc and is deviated to the right side (the side of the perturbation direction) of the ground truth rectangular area Bc.

Further, the detection processing unit 154 performs object detection using the learning image 50A and the perturbation learning image 52-4. Accordingly, the detection processing unit 154 generates a rectangular area Bd4 indicating the detection position regarding the detection target image 90. Since the positional deviation is occurring between the learning image 50A and the perturbation learning image 52-4 due to perturbation, the rectangular area Bd4 does not coincide with the ground truth rectangular area Bc and is deviated to the right side (the side of the perturbation direction) of the ground truth rectangular area Bc.

The parameter calculation unit 160 investigates perturbation dependence of detection results for each of the perturbation learning images (Step S158). Specifically, the parameter calculation unit 160 calculates a relation between the perturbation amount of each perturbation learning image with respect to the learning image before the perturbation, and the rectangular coordinates and the confidence level that are detection results for the corresponding perturbation learning image.

Figure 11:
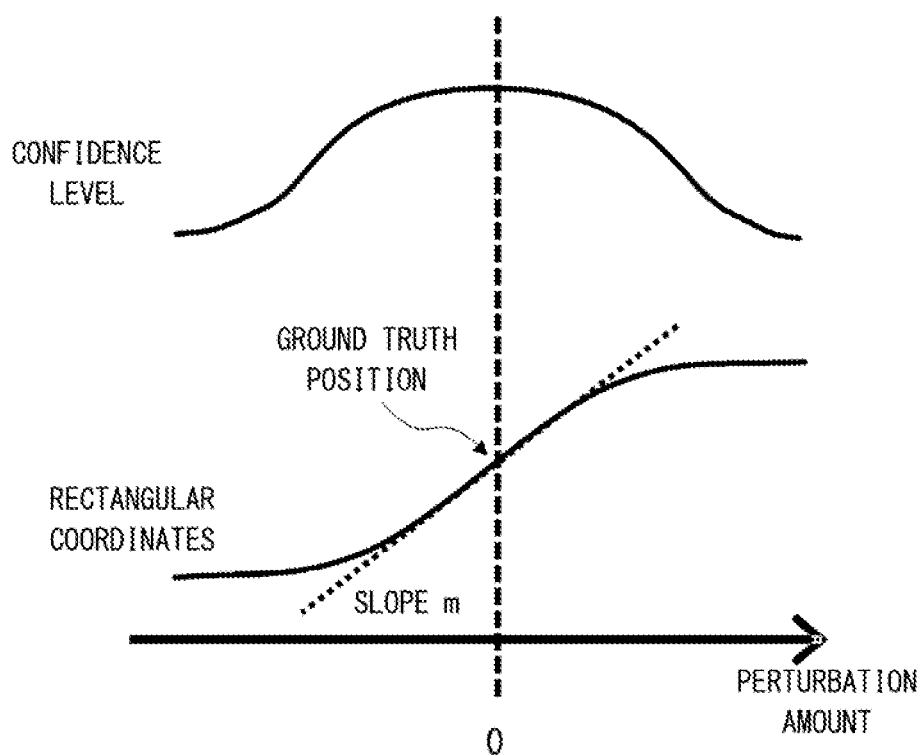
FIG. 11 is a diagram illustrating a relation between a perturbation amount of a perturbation learning image and detection results according to the first example embodiment.

FIG. 11 is a diagram illustrating a relation between the perturbation amount of the perturbation learning image and the detection results according to the first example embodiment. FIG. 11 is a diagram in which the relation between the perturbation amount, and the rectangular coordinates and the confidence level is plotted, the horizontal axis indicating the perturbation amount. While the rectangular coordinates and the confidence level are each shown in a continuous manner in FIG. 11, when perturbation is performed in stages, the rectangular coordinates and the confidence level may each be shown in a discrete manner. Further, in FIG. 11, the left end of the learning image 50A that has not been perturbed is the reference of the rectangular coordinates and the right direction is the positive direction of the rectangular coordinates. That is, the more rightward the rectangular area is located in the learning image 50A, the larger the rectangular coordinates become.

As illustrated in FIG. 11, the rectangular coordinates are changed in accordance with the perturbation amount. The rectangular coordinates when the perturbation amount is equal to 0 correspond to the ground truth position. Then, as shown in FIG. 10, the rectangular coordinates increase (that is, the rectangular area moves toward the right direction) as the perturbation amount increases in the positive direction (right direction). Further, as shown in FIG. 10, the rectangular coordinates decrease (that is, the rectangular area moves toward the left direction) as the perturbation amount increases in the negative direction (left direction). The relation between the rectangular coordinates and the perturbation amount shown in FIG. 11 is merely one example and may be changed depending on detectors.

Further, as illustrated in FIG. 11, the confidence level is changed in accordance with the perturbation amount. Then the confidence level is high when the perturbation amount is in the vicinity of 0. Since there is no positional deviation when the perturbation amount is 0 (in the example shown in FIG. 10, detection results of the perturbation learning image 52-0), the confidence level may become high when the perturbation amount is 0. On the other hand, when detection is performed using low-resolution images such as infrared light images, it is possible that the amount of change in the confidence level may not be large even if the image is perturbed a little. Further, it is possible that some detectors may reduce the resolution by changing, for example, the size of the image during detection. In this case as well, it is possible that the amount of change in the confidence level may not be large even if the image is perturbed a little. Therefore, in the vicinity of perturbation amount=0, the difference in the magnitudes of the confidence levels may not be significantly large.

The parameter calculation unit 160 calculates the integrated parameters so as to increase the selectivity of appropriate detection results when the detection results are output (Step S160). The parameter calculation unit 160 stores the calculated integrated parameters in the parameter storage unit 130. Specifically, the parameter calculation unit 160 calculates the integrated parameters in such a way that the confidence level (adjustment confidence level) when the perturbation amount is 0 becomes a maximum when the confidence level is adjusted (rescored). In other words, since the appropriate detection results are obtained when the perturbation amount is 0, the parameter calculation unit 160 calculates the integrated parameters in such a way that the adjustment confidence level peaks when the perturbation amount is 0. Accordingly, in the processing of S108 (rescoring), the adjustment confidence level regarding the appropriate detection results may become a maximum (peak).

Specific Examples of Calculation of Integrated Parameters and Rescoring

Hereinafter, specific examples of calculation of the integrated parameters (S160) and rescoring (S108) will be described. As described above, the purpose of rescoring is, when the position of the detection target image 90 in one of a plurality of perturbed images obtained by perturbing the input image 40B coincides with the position of the detection target image 90 in the input image 40A, to make detection results regarding this perturbed image the most reliable.

Therefore, as a result of rescoring, the adjustment confidence level in this perturbed image (in the example shown in FIG. 6, the perturbed image 42-2) is made the highest. In the following description, the perturbed image 42 and the perturbation learning image 52 are each simply referred to as a "perturbation pattern" without differentiating between them. Further, the following algorithm is performed for each class.

Each perturbation pattern (perturbation amount) $T_k$ is defined by the following expression 1.

$$\{T_k\}_{k=1,2,\ldots K} \qquad (1)$$

The symbol K denotes the number of perturbation patterns. Further, the subscript k is an index indicating each perturbation pattern. When, for example, the perturbation direction is translation (parallel translation) in the horizontal direction, the only difference between the respective perturbation patterns $T_k$ may be the difference in the x coordinates (positional coordinates of the image in the horizontal direction).

Further, the detection results in the perturbation pattern $T_k$ are defined by the following expression 2.

$$R_{i,k} = \{(D_{i,k}, s_{i,k})\}_{i,k} \qquad (2)$$

The symbol D denotes the detection coordinates (rectangular coordinates) and s denotes the confidence level. Further, the subscript i is an index indicating each of one or more detections (detection candidates) in each image. Therefore, $R_{i,k}$ indicates the detection results in the detection (detection candidate) i of the perturbation pattern $T_k$.

In a detector in which learning is performed using only a plurality of pieces of image data captured by a plurality of modalities that are aligned with each other, as described above, the detection results fluctuate depending on perturbation of one modality image. In the algorithm shown below, it is possible to estimate an image pair in which the positions of the detection target images coincide with each other (a set of the input image that has not been perturbed and the perturbation pattern) using the perturbation dependency.

The result of linear approximation of the perturbation dependence can be expressed by the following expression 3.

$$D_{i,k} - D_{i,l} \cong m(T_k - T_l) \qquad (3)$$

The subscript l is an index indicating each perturbation pattern. Further, m denotes a correction parameter. It is shown in FIG. 11 that the rectangular coordinates (detection coordinates) are changed almost linearly with respect to the change in the perturbation amount in the vicinity of the ground truth position. The slope of this linear change corresponds to m.

Further, the adjustment confidence level is defined by the following expression 4.

$$\tilde{s}_{i,k} = \sum_{j,l} s_{j,l} \exp\{-|(D_{i,k} - D_{j,l} + \Delta_{kl})/\alpha|^2\}/K \qquad (4)$$

Hereinafter, for the sake of convenience of the description, the adjustment confidence level, which is the left side of Expression 4, may be expressed as "s~" ($s^{\sim}_{i,k}$). That is, $s^{\sim}_{i,k}$ indicates the adjustment confidence level regarding the detection i in the perturbation pattern $T_k$. The symbol $\alpha$ denotes a weight adjustment parameter. Further, the subscript j is an index indicating each of one or more detections (detection candidates) in each image.

Further, $\Delta_{kl}$ indicates an amount of correction for correcting the detection coordinates that are fluctuated due to perturbation when the adjustment confidence level is calculated (the confidence levels in the plurality of perturbed images are accumulated) as shown in Expression 4. Note that $\Delta_{kl}$ is defined by the following expression 5.

$$\Delta_{kl} = m(kT_k - T_l) \qquad (5)$$

As shown in Expression 4, the adjustment confidence level $s^{\sim}_{i,k}$ is the accumulation of confidence levels by applying a large weight to the confidence level regarding the detection coordinates $D_{j,l}$ that are close to the detection coordinates $D_{i,k}$ from the detection results of all the perturbation patterns and all the detection results in each image. The term of "exp{ }" corresponds to the "weight". In Expression 4, the closer the detection coordinates $D_{j,l}$ are to the detection coordinates $D_{i,k}$, the smaller $D_{i,k}-D_{j,l}$ is. Further, at this time, since it is estimated that the position of the perturbation pattern is also close, $\Delta_{kl}$ also becomes small. Therefore, when the confidence level $s_{j,l}$ regarding the detection coordinates $D_{j,l}$ that are close to the detection coordinates $D_{i,k}$ regarding the perturbation pattern $T_k$ and the detection i regarding which the adjustment confidence level is to be calculated is added, the term of "exp{ }" becomes large. In contrast, when the confidence level $s_{j,l}$ regarding the detection coordinates $D_{j,l}$ far from the detection coordinates $D_{i,k}$ regarding the perturbation pattern $T_k$ and the detection i is added, the term of "exp{ }" becomes small. Therefore, the term of "exp{ }" functions as the "weight".

Further, in Expression 4, the term of "$|(D_{i,k}-D_{j,l}+\Delta_{kl})/\alpha|$" corresponds to the distance between the detection coordinate $D_{i,k}$ and the detection coordinate $D_{j,l}$ in which the influence of perturbation is corrected. The term of "$D_{i,k}-D_{j,l}+\Delta_{kl}$" can be corrected to "$D_{i,k}-(D_{j,l}-\Delta_{kl})$". Then, "$D_{j,l}-\Delta_{kl}$" corresponds to coordinates in which the detection coordinates $D_{j,l}$ are corrected in view of the influence of perturbation of the perturbation pattern $T_l$ on the perturbation pattern $T_k$ when the confidence level $s_{j,l}$ is accumulated.

Further, the weight adjustment parameter $\alpha$ defines (adjusts) the "weight" that corresponds to the term of "exp{ }" with respect to the above corrected distance. That is, when $\alpha$ is made large in Expression 4, even when the distance between $D_{i,k}$ and $D_{j,l}$ (the same holds true for the corrected distance) is large (that is, even when $|D_{i,k}-D_{j,l}|$ is large), the size of the term of "exp{ }" is prevented from being decreased. In this case, even in a case in which the confidence level that corresponds to $D_{j,l}$, which is far from $D_{i,k}$, is added, it is possible to increase the influence of its confidence level on the adjustment confidence level. In contrast, when $\alpha$ is made small in Expression 4, even in a case in which the distance between $D_{i,k}$ and $D_{j,l}$ (the same holds true for the corrected distance) is small (that is, even when $|D_{i,k}-D_{j,l}|$ is small), the size of the term of "exp{ }" is prevented from being increased. In this case, even in a case in which the confidence level that corresponds to $D_{j,l}$, which is close to $D_{i,k}$, is added, it is possible to decrease the influence of its confidence level on the adjustment confidence level. Therefore, by adjusting the magnitude of $\alpha$, the range of the distance from $D_{i,k}$ that the influence on the adjustment confidence level reaches can be adjusted. Therefore, $\alpha$ functions as a weight adjustment parameter. The same holds true for an example of perturbing a plurality of input images that will be described later.

Figure 12:
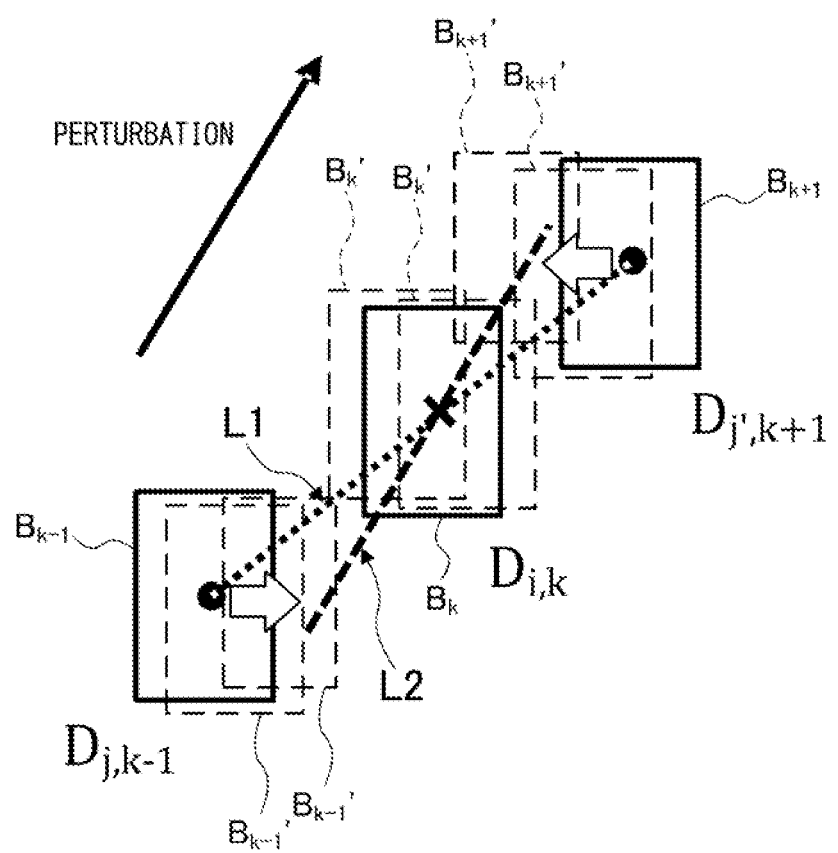
FIG. 12 is a diagram for describing correction of detection coordinates that correspond to accumulated confidence levels in view of an influence of perturbation when confidence levels are accumulated in the first example embodiment.

FIG. 12 is a diagram for describing correction of the detection coordinates that correspond to the accumulated confidence levels in view of the influence of perturbation when the confidence levels are accumulated in the first example embodiment. The symbol $D_{i,k}$ indicates detection coordinates of the detection results $R_{i,k}$ of the perturbation pattern $T_k$ regarding which the adjustment confidence level $s^{\sim}_{i,k}$ is to be calculated. Further, $D_{j,k-1}$ indicates detection coordinates that correspond to the accumulated confidence levels $s_{j,k-1}$ related to the detection results $R_{j,k-1}$ (perturbation pattern $T_{k-1}$). The symbol $D_{j',k+1}$ indicates detection coordinates that correspond to the accumulated confidence level $s_{j',k+1}$ related to the detection results $R_{j',k+1}$ (perturbation pattern $T_{k+1}$). The rectangular area $B_k$ is a rectangular area that corresponds to $D_{i,k}$. The rectangular area $B_{k-1}$ is a rectangular area that corresponds to $D_{j,k-1}$. The rectangular area $B_{k+1}$ is a rectangular area that corresponds to $D_{j',k+1}$. Note that the rectangular area $B_k'$ is a rectangular area related to other detection results in the perturbation pattern $T_k$. The rectangular area $B_{k-1}'$ is a rectangular area related to other detection results in the perturbation pattern $T_{k-1}$. The rectangular area $B_{k+1}'$ is a rectangular area related to other detection results in the perturbation pattern $T_{k+1}$.

At this time, when the confidence level $s_{j,k-1}$ related to the perturbation pattern $T_{k-1}$ is accumulated, $D_{j,k-1}$ is corrected to "$D_{j,k-1}-\Delta_{k(k-1)}$" when it is seen from the rectangular area $B_k$. Further, when the confidence level $s_{j',k+1}$ related to the perturbation pattern $T_{k+1}$ is accumulated, $D_{j',k+1}$ is corrected to "$D_{j',k+1}-\Delta_{k(k+1)}$" when it is seen from the rectangular area $B_k$. Therefore, when the confidence levels related to the other detection results are accumulated for the detection results $R_{i,k}$, the detection coordinates shown by a dotted line L1 are corrected to the detection coordinates shown by a broken line L2.

The reason why confidence levels are accumulated by applying a large weight to the confidence level regarding the detection coordinates $D_{j,l}$ that are close to the detection coordinates $D_{i,k}$ from the detection results of all the perturbation patterns and all the detection results in each image when the adjustment confidence level $\tilde{s}_{i,k}$ is obtained in Expression 4 is due to the following reason. That is, in the detection results by a set of images in which positions of the detection target images coincide with each other (corresponding to perturbation amount=0 in FIG. 11), the confidence level may become naturally high. Then, in the other detection results regarding a detection position which is in the vicinity of the detection position of the detection result as well, the confidence levels regarding the other detection results are also likely to become somewhat high since image information of the detection target is included in the vicinity thereof. Therefore, by accumulating the confidence levels by applying a large weight to the confidence level regarding the detection coordinates $D_{j,l}$ that are close to the detection coordinates $D_{i,k}$ related to the detection results of a set of images in which positions of the detection target images coincide with each other, the accumulated confidence level (adjustment confidence level) may become high.

On the other hand, even in the detection results by a set of images in which positions of the detection target images do not coincide with each other, it is possible that the confidence level of the detection results may be as high as that of the detection results by a set of images in which the positions coincide with each other. However, the possibility that the image information of the detection target exists in the detection position in the vicinity thereof is relatively low. Therefore, it is possible that the confidence level related to the other detection results may not be so high. Accordingly, even when confidence levels are accumulated by applying a large weight to the confidence level regarding the detection coordinates $D_{j,l}$ that are close to the detection coordinates $D_{i,k}$ related to the detection results of the set of the images where the positions of the detection target images do not coincide each other, the accumulated confidence level (adjustment confidence level) may not become higher than that of the detection results of the set of images in which positions of the detection target images coincide with each other. In other words, by adding the confidence levels by applying a large weight to the confidence level regarding the detection coordinates $D_{j,l}$ that are close to the detection coordinates $D_{i,k}$, the accumulated adjustment confidence level related to the set of images in which positions of the detection target images coincide with each other may become higher than the accumulated adjustment confidence level regarding the set of images in which positions of the detection target images do not coincide with each other. Accordingly, by appropriately defining the integrated parameters m and α, the adjustment confidence level related to the detection results by the set of images in which positions of the detection target images coincide with each other may become the highest.

Figure 13:
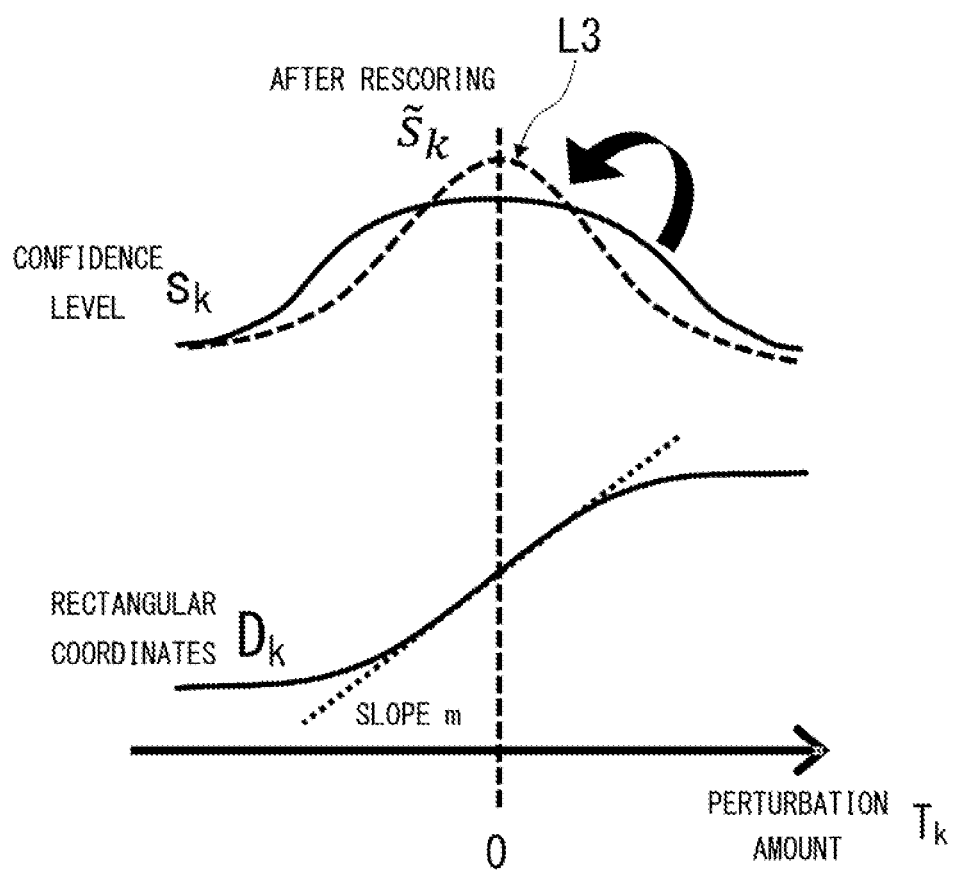
FIG. 13 is a diagram for describing processing by a parameter calculation unit according to the first example embodiment.

FIG. 13 is a diagram for describing processing by the parameter calculation unit 160 according to the first example embodiment. The parameter calculation unit 160 calculates the correction parameter m and the weight adjustment parameter α described above in the learning stage before detection is performed in the operation stage. Specifically, the parameter calculation unit 160 calculates the slope of the linear change in the vicinity of perturbation amount=0 as m from the plot of the relation between the perturbation amount $T_k$ and the rectangular coordinates Dk.

The parameter calculation unit 160 substitutes the calculated m into Expression 4 (Expression 5). Then the parameter calculation unit 160 accumulates the confidence levels for all the detection results $R_{j,l}$ of all the perturbation patterns $T_k$ for each of the detection results $R_{i,k}$ of each perturbation pattern $T_k$ regarding the learning data obtained in the detection processing in S156 using the above Expression 4. Accordingly, the adjustment confidence level $\tilde{s}_{i,k}$ is calculated for each of the detection results $R_{i,k}$. Then, the parameter calculation unit 160 calculates a that makes the adjustment confidence level $\tilde{s}_{i,k}$ regarding the detection results $R_{i,k}$ where the perturbation amount=0 and the detection coordinates coincide with the ground truth position the highest. At this time, the parameter calculation unit 160 may finely adjust m. Accordingly, as shown by a broken line L3, the adjustment confidence level $\tilde{s}_{i,k}$ after rescoring becomes a maximum when perturbation amount=0.

Figure 14:
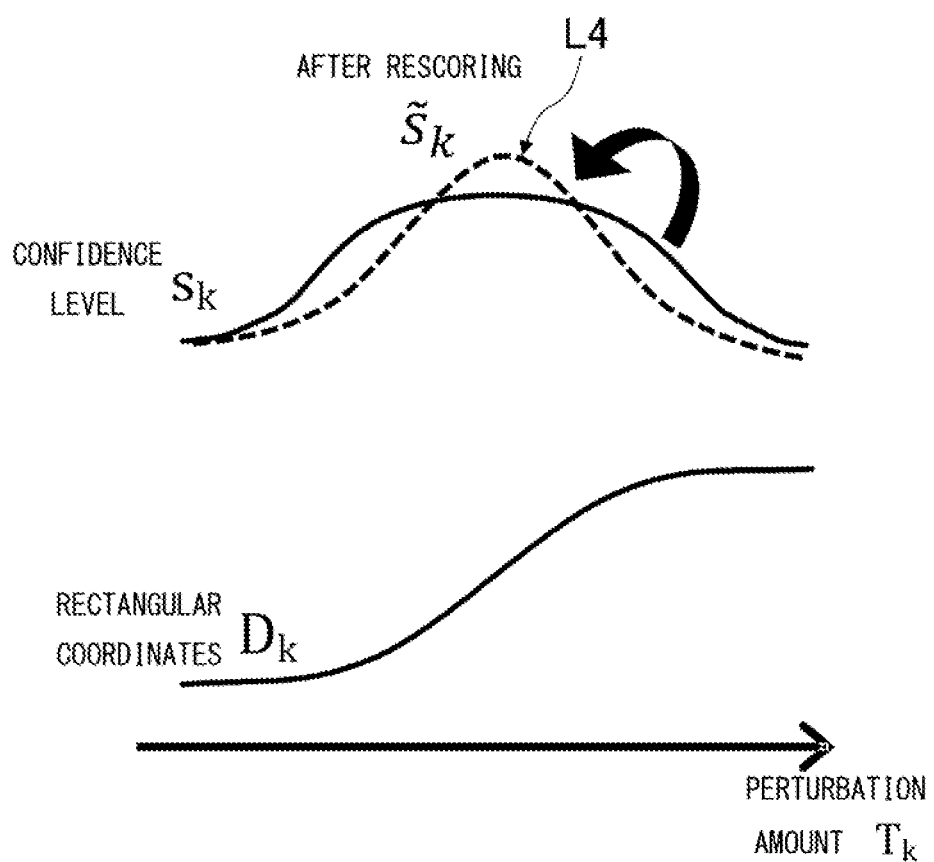
FIG. 14 is a diagram for describing processing by a detection result integration unit according to the first example embodiment.

FIG. 14 is a diagram for describing processing by the detection result integration unit 120 according to the first example embodiment. The score adjustment unit 122 substitutes the integrated parameters m and α calculated by the processing in the parameter calculation unit 160 described above into Expression 4 when detection is performed in the operation stage. Then, the score adjustment unit 122 accumulates the confidence levels for all the detection results $R_{j,l}$ of all the perturbation patterns $T_k$ for each of the detection results $R_{i,k}$ of each perturbation pattern $T_k$ obtained in the detection processing in S106 using the above Expression 4, just like in the learning stage. Then, as shown by the broken line L4 in FIG. 14, the value of one adjustment confidence level $\tilde{s}_{i,k}$ may become the highest.

At this time, the detection result determination unit 124 determines the detection results $R_{i,k}$ regarding the above maximum adjustment confidence level $\tilde{s}_{i,k}$ as the appropriate detection results. Therefore, the detection result determination unit 124 deletes the detection results regarding rectangular area having a large overlap with the rectangular area regarding the above maximum adjustment confidence level $\tilde{s}_{i,k}$. Accordingly, the detection results $R_{i,k}$ regarding the maximum adjustment confidence level $\tilde{s}_{i,k}$ are output.

In the learning stage, the learning image is labeled with a ground truth position in advance, and the plurality of learning images may be a plurality of modality images where there is no positional deviation. Therefore, it is clear which perturbation learning image (perturbation pattern) has the most appropriate (reliable) detection results. On the other hand, in the operation stage, the ground truth position in the input image is unknown and the plurality of input images are a plurality of modality images where there is a positional deviation. Therefore, in the operation stage, it is not known which perturbed image (perturbation pattern) has the most appropriate (reliable) detection results. Then, as a result of rescoring, the adjustment confidence level regarding the perturbed image (detection results) whose position of the detection target image coincides with that of the input image that is not perturbed may peak. Therefore, as a result of rescoring, it becomes possible to determine the perturbed image (detection results) where the positions coincide with each other.

As described above, in the first example embodiment, the object detection apparatus 100 acquires a plurality of perturbed images in which at least one of the plurality of input images is perturbed. The object detection apparatus 100 detects a detection target included in the input images using each of the plurality of perturbed images and one of the plurality of input images that has not been perturbed and acquires, for each of the plurality of perturbed images, the detection position of the detection target and the detection confidence level as detection results. The object detection apparatus 100 calculates the adjustment confidence level for each of the perturbed images using the integrated parameters based on the detection positions and the confidence levels acquired for the plurality of perturbed images. Accordingly, since the adjustment confidence level regarding the appropriate detection results related to perturbed images in the plurality of modality images in which the positions of the detection target images coincide with each other becomes the highest, the detection results regarding the maximum adjustment confidence level is output. Therefore, it is possible to perform object detection with a high accuracy for a plurality of input images captured by the plurality of different modalities without mechanically aligning them using special equipment. Further, since there is no need to use special equipment for alignment, the occurrence of a problem due to alignment errors caused by poor adjustment of equipment or the like can be prevented. Therefore, the object detection apparatus 100 according to the first example embodiment is able to perform object detection with a high accuracy using a plurality of input images captured by the plurality of different modalities.

Further, the object detection apparatus 100 according to the first example embodiment is configured to determine the appropriate detection results by narrowing down the detection results by a plurality of perturbed images based on the adjustment confidence levels, and output the determined detection results. Accordingly, it becomes possible to definitely output the detection results regarding the maximum adjustment confidence level.

Further, when the confidence level is adjusted for the first perturbed image, the object detection apparatus 100 according to the first example embodiment applies a weight so that a large weight is applied regarding the second perturbed image regarding the detection position whose distance to the detection position regarding the first perturbed image is short. Then, the object detection apparatus 100 accumulates the confidence levels of the plurality of perturbed images that have been weighted. Accordingly, it becomes possible to increase the adjustment confidence level regarding the appropriate detection results where the detection target image is present more definitely.

Further, the object detection apparatus 100 according to the first example embodiment acquires the detection results using each of the plurality of perturbation learning images obtained by perturbing at least one of the plurality of learning images and one of the plurality of learning images that has not been perturbed. Then the object detection apparatus 100 calculates the integrated parameters using the detection results. Accordingly, it is possible to calculate integrated parameters that make the adjustment confidence level regarding the appropriate detection results where the detection target image is present the highest more definitely.

Example in which a Plurality of Input Images are Perturbed

While the number of modality images (input images) is two and one of them is perturbed in the aforementioned description, the number of modality images may be three or greater. In this case, the object detection is performed using three or more modality images. Further, in this case, a plurality of modality images may be perturbed. The algorithm in this case will be described below. It is assumed, in the following description, that an input image A, an input image B1, and an input image B2 are a plurality of modality images and the input image B1 and the input image B2 are perturbed. In this case, in the processing of S106, the object detection is performed using the input image A, the perturbed input image B1, and the perturbed input image B2 (the same holds true for the processing of S156).

The perturbation patterns (perturbation amounts) $T_{k1}$ and $T'_{k2}$ are each defined by the following expression 6.

$$\{(T_{k1}, T'_{k2})\}_{k1=1,2\ldots K_1, k2=1,\ldots K_2} \quad (6)$$

The symbol $T_{k1}$ corresponds to the perturbation pattern with which the input image B1 is perturbed and $T'_{k2}$ corresponds to the perturbation pattern with which the input image B2 is perturbed. Further, the subscript k1 indicates the perturbation pattern regarding the input image B1. Further, the subscript k2 indicates the perturbation pattern regarding the input image B2. That is, in this case, the number of perturbation patterns is $K_1 \times K_2$.

Further, the detection results in the set of the perturbation patterns $T_{k1}$ and $T'_{k2}$ are defined by the following expression 7.

$$R_{i,k1,k2} = \{(D_{i,k1,k2}, s_{i,k1,k2})\}_{i,k1,k2} \quad (7)$$

The result of linear approximation of the perturbation dependence can be expressed by the following expression 8.

$$D_{i,k1,k2} - D_{i,l1,l2} \cong m_1(T_{k1}-T_{l1}) + m_2(T'_{k2}-T'_{l2}) \quad (8)$$

The subscript l1 is an index indicating the perturbation pattern regarding the input image B1. Further, the subscript l2 denotes an index indicating the perturbation pattern regarding the input image B2. Further, $m_1$ denotes a correction parameter for the perturbation pattern regarding the input image B1. The symbol $m_2$ denotes a correction parameter for the perturbation pattern regarding the input image B2.

Further, the adjustment confidence level is defined by the following expression 9.

$$\tilde{s}_{i,k1,k2} = \sum_{j,l1,l2} s_{j,l1,l2} \exp\{-|(D_{i,k1,k2} - D_{j,l1,l2} + \Delta_{k1k2l1l2})/\alpha|^2\}/(K_1+K_2) \quad (9)$$

Further, $\Delta_{k1k2l1l2}$ denotes an amount of correction for correcting the detection coordinates that are fluctuated due to perturbation when the adjustment confidence level is calculated as shown in Expression 8. The symbol $\Delta_{k1k2l1l2}$ is defined by the following expression 10.

$$\Delta_{k1k2l1l2} = m_1(T_{k1}-T_{l1}) + m_2(T'_{k2}-T'_{l2}) \quad (10)$$

As shown in Expression 9, the adjustment confidence level $\tilde{s}_{i,k1,k2}$ is obtained by accumulating confidence levels by applying a large weight to the confidence level regarding detection coordinates $D_{j,l1,l2}$ that are close to detection coordinates $D_{i,k1,k2}$ from the detection results of all the perturbation patterns and all the detection results in each image. Just like in Expression 4, the term of "exp{ }" corresponds to the "weight".

Further, in Expression 9, the term of "$|(D_{i,k1,k2}-D_{j,l1,l2}+\Delta_{k1k2l1l2})/\alpha|$" corresponds to the distance of the detection position between $D_{i,k1,k2}$ and $D_{j,l1,l2}$ where the influence of perturbation is corrected. Then, the correction parameter $m_1$ is a correction coefficient of $\Delta_{k1k2l1l2}$ with respect to the difference between a perturbation amount of the perturbation pattern $T_{k1}$ and a perturbation amount of the perturbation pattern $T_{l1}$. The correction parameter $m_2$ is a correction coefficient of $\Delta_{k1k2l1l2}$ with respect to the difference between a perturbation amount of the perturbation pattern $T'_{k2}$ and a perturbation amount of the perturbation pattern $T'_{l2}$. Further, the term of "$D_{i,k1,k2}-D_{j,l1,l2}+\Delta_{k1k2l1l2}$" can be corrected to "$D_{i,k1,k2}-(D_{j,l1,l2}-\Delta_{k1k2l1l2})$". Then, "$D_{j,l1,l2}-\Delta_{k1k2l1l2}$" corresponds to coordinates in which the detection coordinates $D_{j,l1,l2}$ are corrected in view of the influence of perturbation of the perturbation pattern $T_{l1}$ on the perturbation pattern $T_{k1}$ and the influence of perturbation of the perturbation pattern $T'_{l2}$ on the perturbation pattern $T'_{k2}$ when the confidence level $s_{j,l1,l2}$ is accumulated.

Modified Example

Note that the present disclosure is not limited to the aforementioned example embodiment and may be changed as appropriate without departing from the spirit of the present disclosure. For example, the order of the processes in the flowcharts shown in FIGS. 4 and 8 may be changed as appropriate. Further, one or more of the processes in the flowcharts shown in FIGS. 4 and 8 may be omitted.

Further, while the positional deviation in the "images of the plurality of modalities (input images)" occurs due to parallax associated with a deviation of optical axes of a plurality of cameras or due to a time shift in the aforementioned example embodiment, this configuration is merely one example. For example, even when there is no parallax between two input images, the above positional deviation may occur by performing panning, tilting, or zooming in one camera while performing panning, tilting, or zooming that is different from that performed with regard to this camera in the other camera.

Further, while the perturbed image acquisition unit generates perturbed images by perturbing an input image in the aforementioned example embodiment, this configuration is merely one example. For example, the perturbed image acquisition unit may "acquire" perturbed images. For example, a plurality of frames of the input image (input image B) to be perturbed may be acquired. Alternatively, when the camera 30B is moved (including panning, tilting, zooming or the like), images from multiple viewpoints due to the movement may be acquired. The same holds true for perturbation learning images. Therefore, "acquiring a plurality of perturbed images in which at least one of the plurality of input images is perturbed" is not limited to generating perturbed images by perturbing an input image.

Further, when a label is obtained only for one input, a label may be assigned to the other image where the positions do not coincide, using this technique. When, for example, a label has been obtained in an infrared light image but not in a visible light image, the position, in the visible light image, that corresponds to the position, in the infrared light image, to which the label has been assigned may be detected and a label may be assigned to the visible light image using the above technique.

Further, while the perturbed images are generated by translating the input image in the aforementioned example embodiment, this configuration is merely one example. The perturbation may not be a parallel translation of an image. For example, the perturbed images may be generated by rotating the image.

Further, in the aforementioned example embodiment, a rectangular area regarding the highest adjustment confidence level among the rectangular areas actually detected is left in the processing of S110 (FIG. 7), this configuration is merely one example. The rectangular area to be processed in the processing of S110 may include not only the rectangular areas actually detected but also a rectangular area in which the position is corrected as shown in FIG. 12.

Further, while the perturbation amount is predetermined in the aforementioned example embodiment, this configuration is merely one example. When the distance to the detection target can be estimated, the perturbation amount may be changed in accordance with the distance to the detection target. For example, when the distance to the detection target is short, the perturbation amount may be made large.

In the above-described examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described with reference to the example embodiment, the present disclosure is not limited to the above example embodiment. Various changes that may be understood by those skilled in the art may be made to the configurations and the details of the present application.

The whole or part of the example embodiment disclosed above can be described as, but not limited to, the following supplementary notes.

Supplementary Note 1

An object detection apparatus comprising:
input image acquisition means for acquiring a plurality of input images in which a specific detection target is captured by a plurality of different modalities;
perturbed image acquisition means for acquiring a plurality of perturbed images in which at least one of the plurality of input images is perturbed;
detection processing means for detecting the detection target included in the input images using each of the plurality of perturbed images and one of the plurality of input images that has not been perturbed, and acquiring, for each of the plurality of perturbed images, a detection position of the detection target and a detection confidence level as detection results;
adjustment means for calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and
output means for outputting detection results of the detection target based on the adjusted confidence levels.

Supplementary Note 2

The object detection apparatus according to Supplementary Note 1, further comprising determination means for narrowing down detection results obtained by using the plurality of perturbed images based on the adjusted confidence levels and determining appropriate detection results, wherein the output means outputs the determined detection results.

Supplementary Note 3

The object detection apparatus according to Supplementary Note 1 or 2, wherein, when the confidence level for a first perturbed image is adjusted, the adjustment means applies a weight so that a large weight is applied regarding a second perturbed image regarding a detection position whose distance to a detection position regarding the first perturbed image is short and accumulates the confidence levels of the plurality of perturbed images.

Supplementary Note 4

The object detection apparatus according to Supplementary Note 3, wherein
the parameters include:
  a first parameter for correcting the distance in accordance with a difference between a perturbation amount of the first perturbed image and a perturbation amount of the second perturbed image; and
  a second parameter for defining a weight with respect to the distance.

Supplementary Note 5

The object detection apparatus according to any one of Supplementary Notes 1 to 4, further comprising parameter calculation means for calculating the parameters which make the adjusted confidence level for the perturbed image regarding a detection position that corresponds to the detection target the highest.

Supplementary Note 6

The object detection apparatus according to Supplementary Note 5, wherein the parameter calculation means calculates the parameters using detection results obtained by using each of a plurality of perturbation learning images obtained by perturbing at least one of a plurality of learning images to which a ground truth position of the detection target is attached in advance and where positions of the detection target coincide with each other and one of the plurality of learning images that has not been perturbed.

Supplementary Note 7

An object detection system comprising:
at least one image-capturing device; and
the object detection apparatus according to any one of Supplementary Notes 1-6,
wherein the input image acquisition means acquires the plurality of input images captured by the image-capturing device.

Supplementary Note 8

An object detection method comprising:
acquiring a plurality of input images in which a specific detection target is captured by a plurality of different modalities;
acquiring a plurality of perturbed images in which at least one of the plurality of input images is perturbed;
detecting the detection target included in the input images using each of the plurality of perturbed images and one of the plurality of input images that has not been perturbed, and acquiring, for each of the plurality of perturbed images, a detection position of the detection target and a detection confidence level as detection results;
calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and
outputting detection results of the detection target based on the adjusted confidence levels.

Supplementary Note 9

The object detection method according to Supplementary Note 8, comprising:
narrowing down detection results obtained by using the plurality of perturbed images based on the adjusted confidence levels and determining appropriate detection results; and
outputting the determined detection result.

Supplementary Note 10

The object detection method according to Supplementary Note 8 or 9, comprising applying, when the confidence level for a first perturbed image is adjusted, a weight so that a large weight is applied regarding a second perturbed image regarding a detection position whose distance to a detection position regarding the first perturbed image is short and accumulating the confidence levels of the plurality of perturbed images.

Supplementary Note 11

The object detection method according to Supplementary Note 10, wherein
the parameters include:
  a first parameter for correcting the distance in accordance with a difference between a perturbation amount of the first perturbed image and a perturbation amount of the second perturbed image; and
  a second parameter for defining a weight with respect to the distance.

Supplementary Note 12

The object detection method according to any one of Supplementary Notes 8 to 11, comprising calculating the parameters which make the adjusted confidence level for the perturbed image regarding a detection position that corresponds to the detection target the highest.

Supplementary Note 13

The object detection method according to Supplementary Note 12, comprising calculating the parameters using detection results obtained by using each of a plurality of perturbation learning images obtained by perturbing at least one of a plurality of learning images to which a ground truth position of the detection target is attached in advance and where positions of the detection target coincide with each other and one of the plurality of learning images that has not been perturbed.

Supplementary Note 14

A non-transitory computer readable medium storing a program for causing a computer to execute the following steps of:
  acquiring a plurality of input images in which a specific detection target is captured by a plurality of different modalities;
  acquiring a plurality of perturbed images in which at least one of the plurality of input images is perturbed;
  detecting the detection target included in the input images using each of the plurality of perturbed images and one of the plurality of input images that has not been perturbed, and acquiring, for each of the plurality of perturbed images, a detection position of the detection target and α detection confidence level as detection results;
  calculating, based on the detection positions and the confidence levels acquired for the plurality of perturbed images, an adjusted confidence level for each of the plurality of perturbed images using parameters for making an adjustment so that a confidence level for a set of the input image that has not been perturbed and the perturbed image in which the position of the detection target in the input image coincides with the position of the detection target in the perturbed image becomes relatively high; and
  outputting detection results of the detection target based on the adjusted confidence levels.

REFERENCE SIGNS LIST

1 Object Detection Apparatus
2 Input Image Acquisition Unit
4 Perturbed Image Acquisition Unit
6 Detection Processing Unit
8 Adjustment Unit
10 Output Unit
20 Object Detection System
30 Camera
100 Object Detection Apparatus
110 Input Image Acquisition Unit
112 Perturbed Image Acquisition Unit
114 Detection Processing Unit
116 Detection Model Storage Unit
120 Detection Result Integration Unit
122 Score Adjustment Unit
124 Detection Result Determination Unit
130 Parameter Storage Unit
140 Detection Result Output Unit
150 Learning Data Storage Unit
152 Perturbed Image Acquisition Unit
154 Detection Processing Unit
160 Parameter Calculation Unit

What is claimed is:

1. An object detection apparatus comprising:
  a processor; and
  a memory storing instructions executable by the processor to:
    acquire a plurality of input images in which a detection target is captured using a plurality of different modalities;
    acquire a plurality of perturbed images in which at least one of the plurality of input images is perturbed;
    detect the detection target included in the input images using each of the plurality of perturbed images and one of the plurality of input images that has not been perturbed, and acquire, for each of the plurality of perturbed images, a detection position of the detection target and a detection confidence level as detection results;
    calculate, based on the detection position and the confidence level acquired for each of the plurality of perturbed images, an adjusted confidence level for each of the plurality of perturbed images using adjustment parameters sch that a confidence level for a set of the input image that has not been perturbed and the perturbed image in which the position of the detection target in the input image coincides with the position of the detection target in the perturbed image becomes relatively higher than a confidence level for a set of the input image that has not been perturbed and the perturbed image in which the position of the detection target in the input image does not coincide with the position of the detection target in the perturbed image; and
    output the detection results of the detection target based on the adjusted confidence level for each of the plurality of perturbed images,
    wherein, when the confidence level for a first perturbed image having a first detection position is adjusted, a weight so that a specified weight is applied to a second perturbed image having a second detection that is less than a threshold distance from the first detection position, and the confidence level of each of the plurality of perturbed images is accumulated.

2. The object detection apparatus according to claim 1, wherein the instructions are executable by the processor to further:
  narrow down the detection results based on the adjusted confidence level for each of the plurality of perturbed images, and determine appropriate corresponding detection results; and
  output the corresponding detection results.

3. The object detection apparatus according to claim 1, wherein
  the adjustment parameters include:
    a first parameter for correcting a distance between the second perturbed image and the first perturbed image in accordance with a difference between a perturbation amount of the first perturbed image and a perturbation amount of the second perturbed image; and
    a second parameter for defining the weight with respect to the distance.

4. The object detection apparatus according to claim 1, wherein the instructions are executable by the processor to further calculate the adjustment parameters such that the adjusted confidence level for the perturbed image having the detection position that corresponds to the detection target is highest.

5. The object detection apparatus according to claim 4, wherein the instructions are executable by the processor to calculate the parameters using detection results obtained by using each of a plurality of perturbation learning images obtained by perturbing at least one of a plurality of learning images to which a ground truth position of the detection target is provided in advance and where positions of the detection target coincide with each other and one of the plurality of learning images that has not been perturbed.

6. An object detection method performed by a computer and comprising:
   acquiring a plurality of input images in which a detection target is captured using a plurality of different modalities;
   acquiring a plurality of perturbed images in which at least one of the plurality of input images is perturbed;
   detecting the detection target included in the input images using each of the plurality of perturbed images and one of the plurality of input images that has not been perturbed, and acquiring, for each of the plurality of perturbed images, a detection position of the detection target and a detection confidence level as detection results;
   calculating, based on the detection position and the confidence level acquired for each of the plurality of perturbed images, an adjusted confidence level for each of the plurality of perturbed images using adjustment parameters sch that a confidence level for a set of the input image that has not been perturbed and the perturbed image in which the position of the detection target in the input image coincides with the position of the detection target in the perturbed image becomes higher than a confidence level for a set of the input image that has not been perturbed and the perturbed image in which the position of the detection target in the input image does not coincide with the position of the detection target in the perturbed image; and
   outputting the detection results of the detection target based on the adjusted confidence level for each of the plurality of perturbed images,
   wherein, when the confidence level for a first perturbed image having a first detection position is adjusted, a weight so that a specified weight is applied to a second perturbed image having a second detection that is less than a threshold distance from the first detection position, and the confidence level of each of the plurality of perturbed images is accumulated.

7. The object detection method according to claim 6, further comprising:
   narrowing down the detection results based on the adjusted confidence level for each of the plurality of perturbed images, and determining corresponding detection results; and
   outputting the corresponding detection results.

8. The object detection method according to claim 6, wherein
   the parameters include:
   the adjustment parameters include:
      a first parameter for correcting a distance between the second perturbed image and the first perturbed image in accordance with a difference between a perturbation amount of the first perturbed image and a perturbation amount of the second perturbed image; and
      a second parameter for defining the weight with respect to the distance.

9. The object detection method according to claim 6, further comprising calculating the adjustment parameters such that the adjusted confidence level for the perturbed image having the detection position that corresponds to the detection target is highest.

10. The object detection method according to claim 9, further comprising calculating the parameters using detection results obtained by using each of a plurality of perturbation learning images obtained by perturbing at least one of a plurality of learning images to which a ground truth position of the detection target is provided in advance and where positions of the detection target coincide with each other and one of the plurality of learning images that has not been perturbed.

11. A non-transitory computer readable medium storing a program executable by a computer to perform processing comprising:
   acquiring a plurality of input images in which a detection target is captured using a plurality of different modalities;
   acquiring a plurality of perturbed images in which at least one of the plurality of input images is perturbed;
   detecting the detection target included in the input images using each of the plurality of perturbed images and one of the plurality of input images that has not been perturbed, and acquiring, for each of the plurality of perturbed images, a detection position of the detection target and a detection confidence level as detection results;
   calculating, based on the detection position and the confidence level acquired for each of the plurality of perturbed images, an adjusted confidence level for each of the plurality of perturbed images using adjustment parameters sch that a confidence level for a set of the input image that has not been perturbed and the perturbed image in which the position of the detection target in the input image coincides with the position of the detection target in the perturbed image becomes higher than a confidence level for a set of the input image that has not been perturbed and the perturbed image in which the position of the detection target in the input image does not coincide with the position of the detection target in the perturbed image; and
   outputting the detection results of the detection target based on the adjusted confidence level for each of the plurality of perturbed images,
   wherein, when the confidence level for a first perturbed image having a first detection position is adjusted, a weight so that a specified weight is applied to a second perturbed image having a second detection that is less than a threshold distance from the first detection position, and the confidence level of each of the plurality of perturbed images is accumulated.

* * * * *